United States Patent
Sundararajan et al.

(10) Patent No.: US 10,237,889 B2
(45) Date of Patent: Mar. 19, 2019

(54) CONDITIONAL UPLINK GRANT

(71) Applicant: QUALCOMM Incorporated, San Diego, CA (US)

(72) Inventors: Jay Kumar Sundararajan, San Diego, CA (US); Jing Jiang, San Diego, CA (US); Tingfang Ji, San Diego, CA (US); Chih Ping Li, San Diego, CA (US); Gavin Bernard Horn, La Jolla, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/186,998

(22) Filed: Jun. 20, 2016

(65) Prior Publication Data

US 2017/0171882 A1    Jun. 15, 2017

Related U.S. Application Data

(60) Provisional application No. 62/265,370, filed on Dec. 9, 2015.

(51) Int. Cl.
*H04W 72/14* (2009.01)
*H04W 72/12* (2009.01)
(Continued)

(52) U.S. Cl.
CPC ....... *H04W 72/14* (2013.01); *H04W 52/0216* (2013.01); *H04W 72/005* (2013.01);
(Continued)

(58) Field of Classification Search
CPC ..... H04W 72/00; H04W 72/02; H04W 72/04; H04W 72/14; H04W 72/005;
(Continued)

(56) References Cited

U.S. PATENT DOCUMENTS 7,463,616 B1 * 12/2008 Earnshaw ......... H04W 72/1231
370/337
9,271,305 B2   2/2016 He
(Continued)

FOREIGN PATENT DOCUMENTS

EP    2557883 A2    2/2013

OTHER PUBLICATIONS

International Search Report and Written Opinion—PCT/US2016/064842—ISA/EPO—dated Mar. 10, 2017.

*Primary Examiner* — Peter Chen
(74) *Attorney, Agent, or Firm* — Loza & Loza, LLP

(57) ABSTRACT

A method, an apparatus, and a processor-readable storage medium for wireless communication are provided. In an aspect, the apparatus is a subordinate entity that receives an indication of a resource allocated for an uplink transmission. The subordinate entity also receives a condition associated with the resource. The subordinate entity evaluates whether the condition is satisfied and determines whether to transmit a packet using the resource based on the condition being satisfied. In another aspect, the apparatus is a scheduling entity that generates an indication of a resource allocated for an uplink transmission. The resource is associated with a condition that limits access to the resource. The scheduling entity transmits the indication and the condition to a subordinate entity and receives a packet from the subordinate entity via the resource based on the condition being satisfied.

34 Claims, 12 Drawing Sheets

(51) Int. Cl.
    *H04W 72/00* (2009.01)
    *H04W 72/04* (2009.01)
    *H04W 52/02* (2009.01)
    *H04W 74/04* (2009.01)

(52) U.S. Cl.
    CPC ....... *H04W 72/042* (2013.01); *H04W 72/048* (2013.01); *H04W 72/1268* (2013.01); *H04W 72/1289* (2013.01); *H04W 74/04* (2013.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/164* (2018.01); *Y02D 70/22* (2018.01); *Y02D 70/26* (2018.01)

(58) Field of Classification Search
    CPC ............. H04W 72/042; H04W 72/048; H04W 72/1268; H04W 72/0446; H04W 72/0453; H04W 72/1284; H04W 72/1289; H04W 88/02; H04W 52/0216; H04W 28/18
    See application file for complete search history.

(56) References Cited

U.S. PATENT DOCUMENTS

| | | | |
|---|---|---|---|
| 2011/0021232 A1 | 1/2011 | Kazmi et al. | |
| 2011/0211447 A1 | 9/2011 | Wang et al. | |
| 2012/0307767 A1 | 12/2012 | Yamada et al. | |
| 2013/0203372 A1 | 8/2013 | Sigle et al. | |
| 2015/0341938 A1 | 11/2015 | Tawashi et al. | |
| 2016/0028533 A1* | 1/2016 | Kazmi .............. | H04W 72/1278 370/296 |
| 2016/0088653 A1 | 3/2016 | Januszewski et al. | |

* cited by examiner

CONDITIONAL UPLINK GRANT

CROSS-REFERENCE TO RELATED APPLICATIONS

This application claims priority to and the benefit of U.S. Provisional Application Ser. No. 62/265,370, entitled "CONDITIONAL UPLINK GRANT" filed on Dec. 9, 2015, the entire contents of which is incorporated herein by reference.

TECHNICAL FIELD

The present disclosure relates generally to communication systems, and more particularly, to communicating a resource grant from a scheduling network to a user equipment in a wireless communications system.

BACKGROUND

Wireless communication systems are widely deployed to provide various telecommunication services such as telephony, video, data, messaging, broadcasts, and so on. Such networks, which are usually multiple access networks, support communications for multiple users by sharing the available network resources.

Uplink packet transmissions typically operate based on a request-grant mechanism. For example, a subordinate entity (e.g., UE) intending to transmit an uplink packet to a scheduling entity (e.g., base station) may send a request for transmission resources to the scheduling entity. In response, the scheduling entity may provide a grant of resources to the subordinate entity based on the request. The subordinate entity may then transmit the uplink packet based on the grant. However, such request-grant mechanism may increase packet latency as a number of signals/messages need to be exchanged before the subordinate entity is granted the resources to transmit the uplink packet.

In applications that require a low packet latency, delay may be reduced by forgoing the request-grant mechanism and allowing subordinate entities to transmit in an unscheduled mode in a distributed manner without waiting for a grant. However, such a distributed transmission mechanism is susceptible to collisions since multiple subordinate entities may transmit over the same resource. Accordingly, there is a need for a mechanism that limits transmission collisions without incurring the typical overhead and delay associated with the subordinate entities communicating with the scheduling entity.

As the demand for mobile broadband access continues to increase, research and development continue to advance wireless communication technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect of the disclosure, a method, a processor-readable storage medium, and an apparatus are provided that relate to a subordinate entity configured to communicate with a scheduling entity in a wireless network. The method includes receiving, from a scheduling entity, an indication at the subordinate entity. The indication indicates at least one resource allocated for an uplink transmission. The method also includes receiving, from the scheduling entity, at least one condition associated with the at least one resource. The method further includes evaluating at the subordinate entity whether the at least one condition is satisfied and determining whether to transmit a packet using the at least one resource based on the at least one condition being satisfied.

In one example, the apparatus may be a subordinate entity. The subordinate entity may include means for receiving, from a scheduling entity, an indication of at least one resource allocated for an uplink transmission, means for receiving, from the scheduling entity, at least one condition associated with the at least one resource, means for evaluating whether the at least one condition is satisfied, and means for determining whether to transmit a packet using the at least one resource based on the at least one condition being satisfied.

In another example, the apparatus may be a subordinate entity that includes a memory, a transceiver, and a processing system coupled to the memory and the transceiver. The memory and the processing system are configured to receive, from a scheduling entity, an indication of at least one resource allocated for an uplink transmission, receive, from the scheduling entity, at least one condition associated with the at least one resource, evaluate whether the at least one condition is satisfied, and determine whether to transmit a packet using the at least one resource based on the at least one condition being satisfied.

The processor-readable storage medium may have code/instructions stored thereon. The processor-readable storage medium may be a transitory storage medium or a non-transitory storage medium. The code/instructions may be executable by a processor. When executed, the code/instructions may cause the processor to receive, from a scheduling entity, an indication of at least one resource allocated for an uplink transmission, receive, from the scheduling entity, at least one condition associated with the at least one resource, evaluate whether the at least one condition is satisfied, and determine whether to transmit a packet using the at least one resource based on the at least one condition being satisfied.

In another aspect of the disclosure, a method, a processor-readable storage medium, and an apparatus are provided that relate to a scheduling entity in a wireless network.

The method may include generating an indication at the scheduling entity. The indication indicates at least one resource allocated for an uplink transmission, the at least one resource associated with at least one condition limiting access to the at least one resource. The method may further include transmitting the indication and the at least one condition to at least one subordinate entity and receiving a packet from the at least one subordinate entity via the at least one resource based on the at least one condition being satisfied.

In one example, the apparatus may be a scheduling entity. The scheduling entity may include means for generating an indication of at least one resource allocated for an uplink transmission, the at least one resource associated with at least one condition limiting access to the at least one resource, means for transmitting the indication and the at least one condition to at least one subordinate entity, and means for receiving a packet from the at least one subordinate entity via the at least one resource based on the at least one condition being satisfied.

In another example, the apparatus may be a scheduling entity that includes a memory, a transceiver, and a processing system coupled to the memory and the transceiver. The memory and the processing system are configured to generate an indication of at least one resource allocated for an uplink transmission, the at least one resource associated with at least one condition limiting access to the at least one resource, transmit the indication and the at least one condition to at least one subordinate entity, and receive a packet from the at least one subordinate entity via the at least one resource based on the at least one condition being satisfied.

The processor-readable storage medium may have code/instructions stored thereon. The processor-readable storage medium may be a transitory storage medium or a non-transitory storage medium. The code/instructions may be executable by a processor. When executed, the code/instructions may cause the processor to generate an indication of at least one resource allocated for an uplink transmission, the at least one resource associated with at least one condition limiting access to the at least one resource, transmit the indication and the at least one condition to at least one subordinate entity, and receive a packet from the at least one subordinate entity via the at least one resource based on the at least one condition being satisfied.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Figure 1:
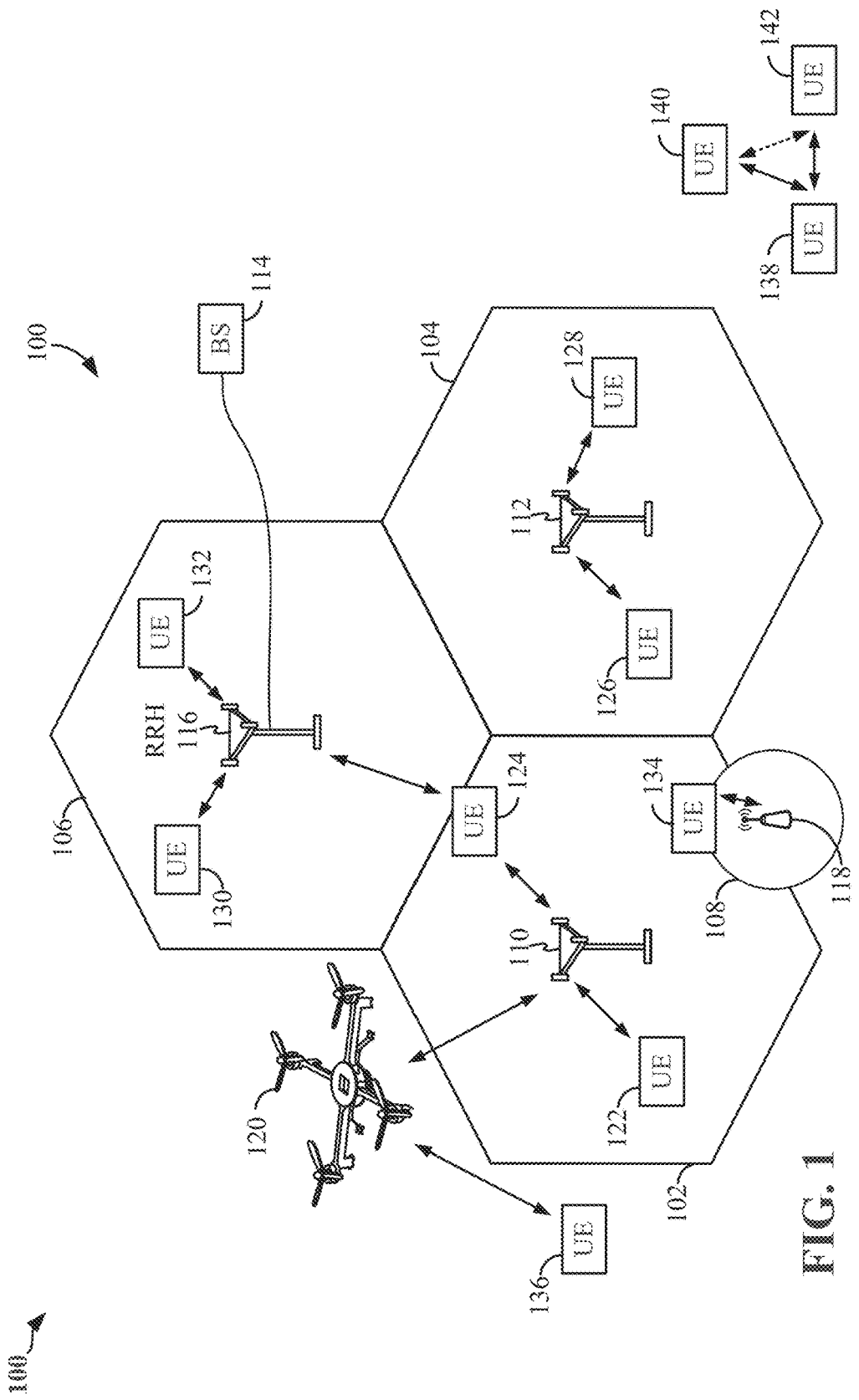
FIG. 1 is a diagram illustrating an example of a network architecture.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
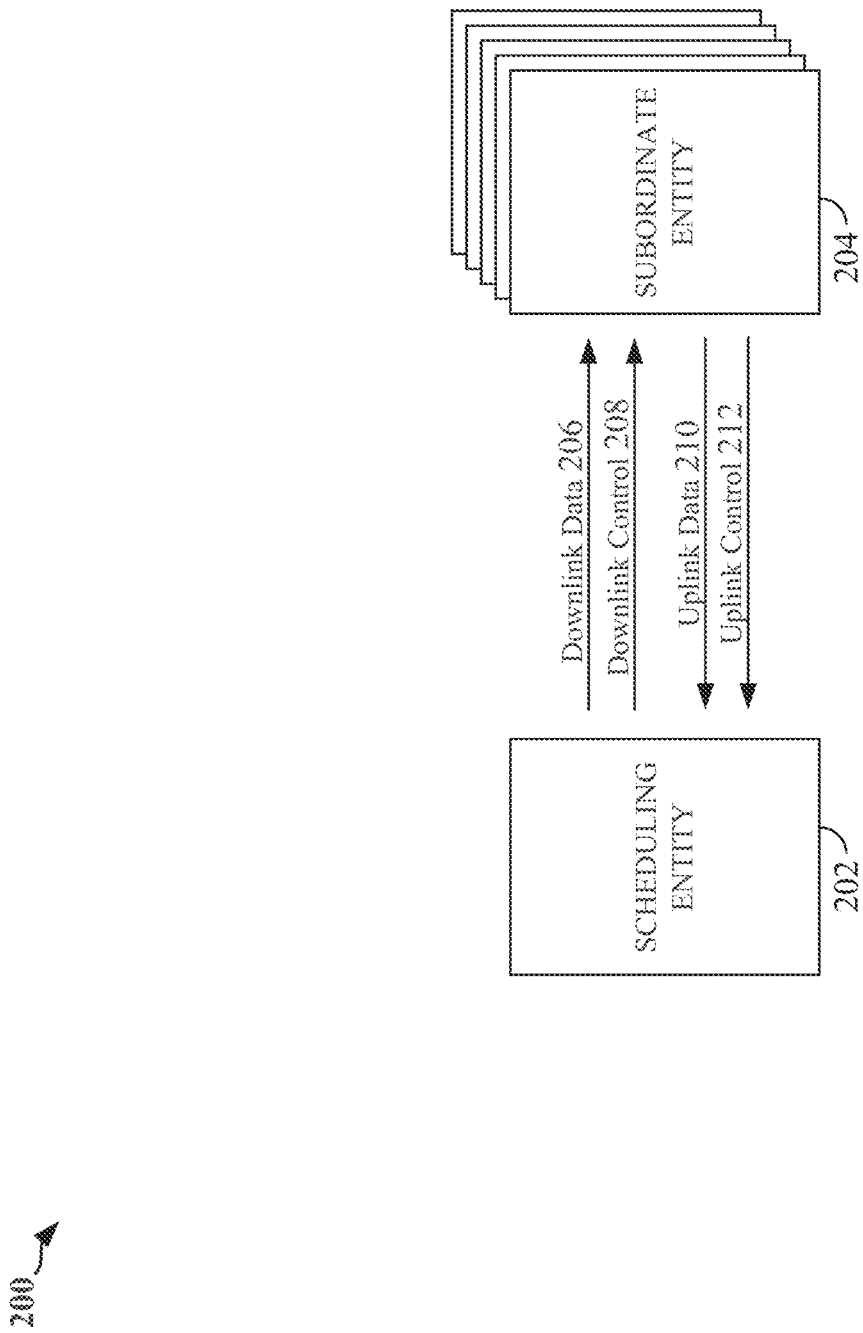
FIG. 2 is a block diagram conceptually illustrating an example of a scheduling entity communicating with one or more subordinate entities according to some embodiments.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
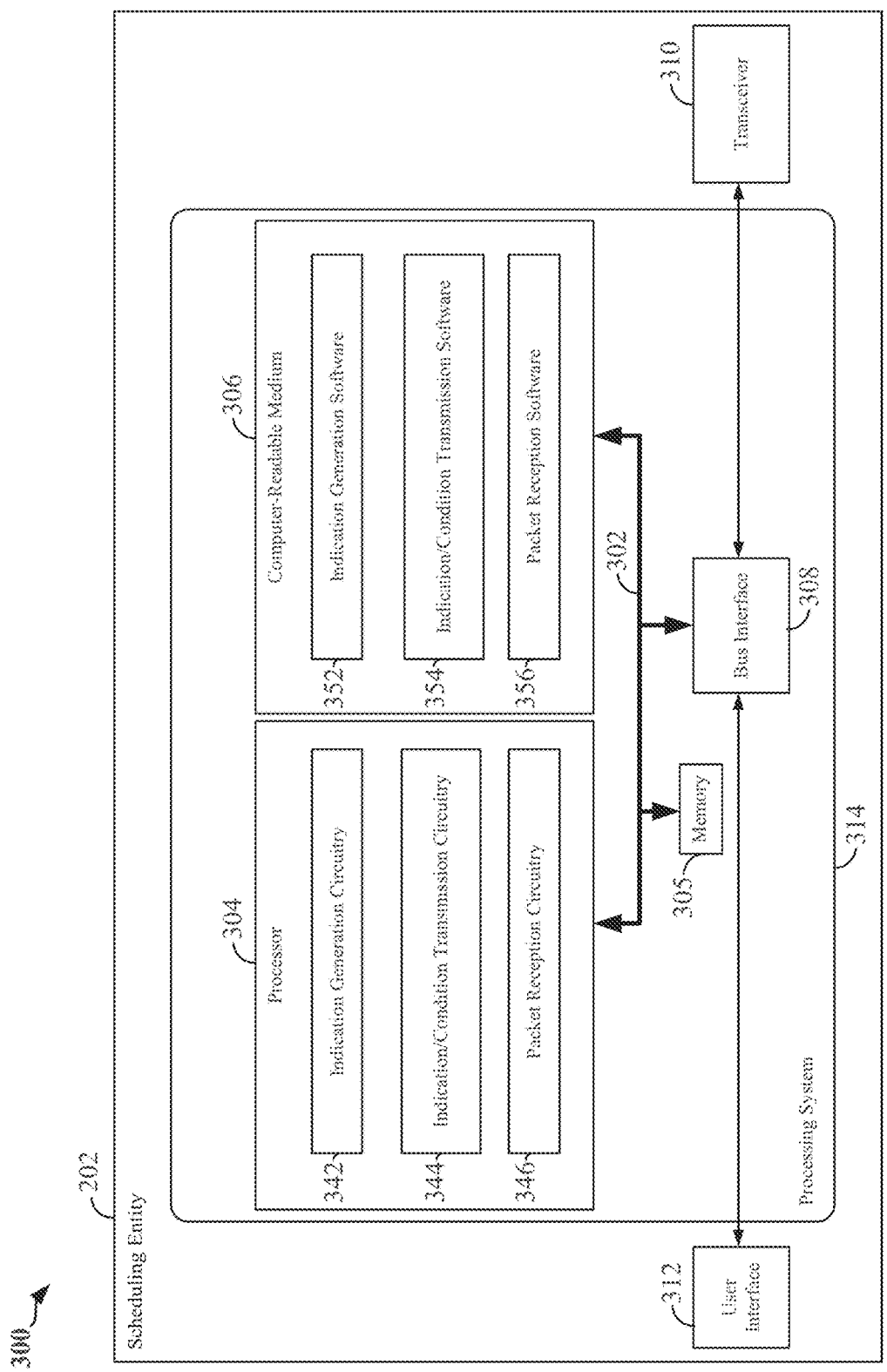
FIG. 3 is a block diagram illustrating an example of a hardware implementation for a scheduling entity employing a processing system according to some embodiments.

FIG. 3 is a conceptual diagram 300 illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), such as a base station 104 or a base station 108 of FIG. 1, a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE).

In other examples, the scheduling entity 202 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include indication generation circuitry 342, configured to generate an indication of at least one resource allocated for an uplink transmission, the at least one resource associated with at least one condition limiting access to the at least one resource. The indication generation circuitry 342 may operate in coordination with indication generation software 352. The processor 304 may further include indication/condition transmission circuitry 344, configured to transmit the indication and the at least one condition to at least one subordinate entity. The indication/condition transmission circuitry 344 may operate in coordination with indication/condition transmission software 354. The processor 304 may further include packet reception circuitry 346, configured to receive a packet from the at least one subordinate entity via the at least one resource based on the at least one condition being satisfied. The packet reception circuitry 346 may operate in coordination with packet reception software 306.

In some aspects of the disclosure, the scheduling entity 202 includes means 342 for generating an indication of at least one resource allocated for an uplink transmission, the at least one resource associated with at least one condition limiting access to the at least one resource. The scheduling entity 202 also includes means 344 and 310 for transmitting the indication and the at least one condition to at least one subordinate entity. The scheduling entity 202 further includes means 346 and 310 for receiving a packet from the at least one subordinate entity via the at least one resource based on the at least one condition being satisfied.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
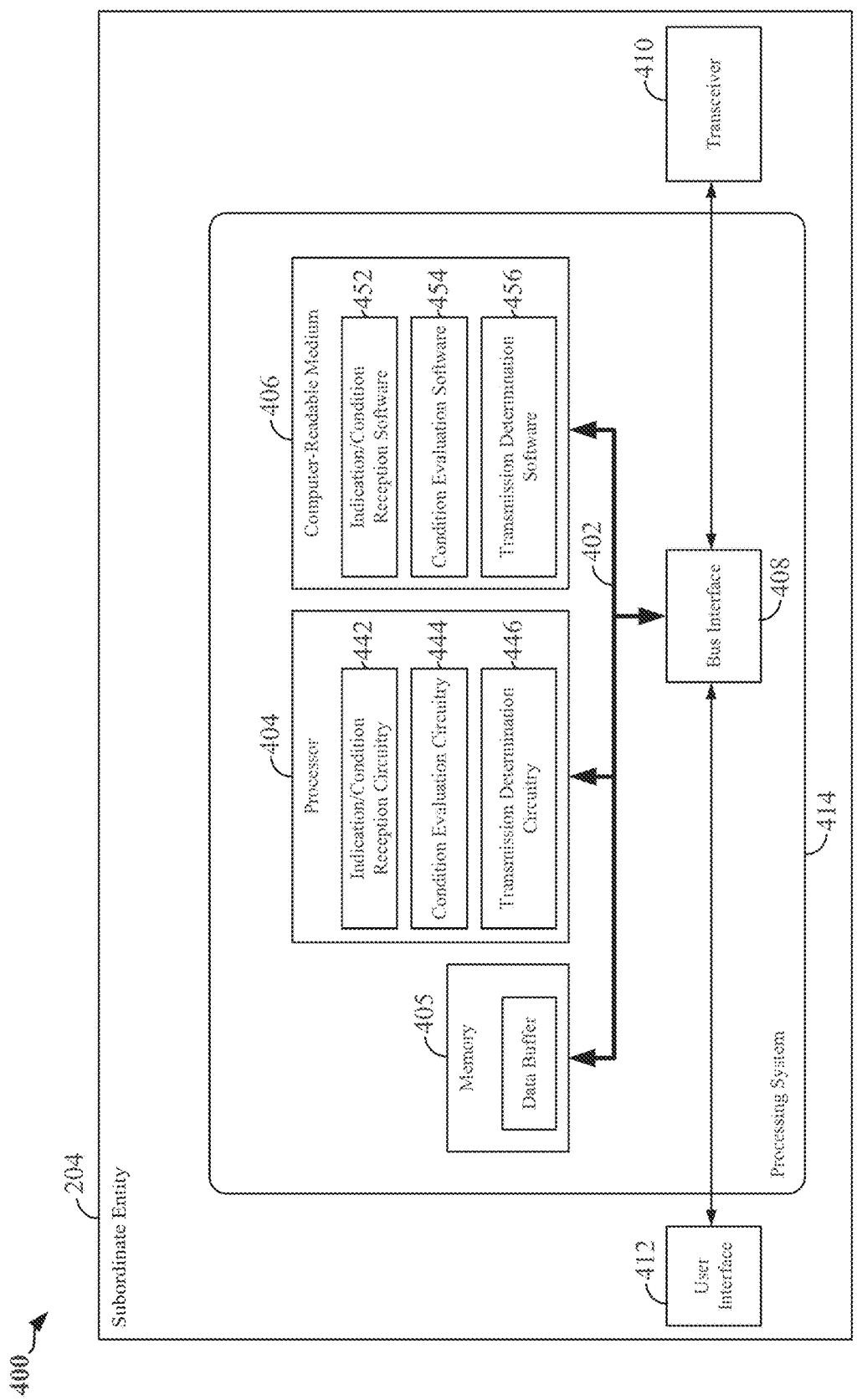
FIG. 4 is a block diagram illustrating an example of a hardware implementation for a subordinate entity employing a processing system according to some embodiments.

FIG. 4 is a conceptual diagram 400 illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3.

In some aspects of the disclosure, the processor 404 may include indication/condition reception circuitry 442, configured to receive, from a scheduling entity, an indication of at least one resource allocated for an uplink transmission and at least one condition associated with the at least one resource. In some examples, received indications and/or conditions may be temporarily stored in a data buffer within the memory 405. The indication/condition reception circuitry 442 may operate in coordination with indication/condition reception software 452. The processor 404 may further include condition evaluation circuitry 444, configured to evaluate whether the at least one condition is satisfied. The condition evaluation circuitry 444 may operate in coordination with condition evaluation software 454. The processor 404 may further include transmission determination circuitry 446, configured to determine whether to transmit a packet using the at least one resource based on the at least one condition being satisfied. The transmission determination circuitry 446 may operate in coordination with transmission determination software 456.

In some aspects of the disclosure, the subordinate entity 204 includes means 442 and 410 for receiving, from a scheduling entity, an indication of at least one resource allocated for an uplink transmission and at least one condition associated with the at least one resource. The subordinate entity 204 also includes means 444 for evaluating whether the at least one condition is satisfied. The subordinate entity 204 further includes means 446 and 410 for determining whether to transmit a packet using the at least one resource based on the at least one condition being satisfied.

Uplink Operation

Typically, scheduled uplink packet transmissions operate based on a request-grant mechanism. For example, when a subordinate entity (e.g., UE) intends to transmit an uplink packet to a scheduling entity (e.g., base station), the subordinate entity may request for transmission resources by sending a scheduling request to a scheduler at the scheduling entity. Along with the scheduling request, the subordinate entity may also send information needed at the scheduler, such as buffer status, power headroom, etc. The scheduling entity may send a grant to the subordinate entity based on the scheduling request and information received from the subordinate entity. The grant specifies relevant scheduling information indicating which resources are granted for the subordinate entity's transmission. The subordinate entity may then transmit uplink data based on the grant.

In some applications, there may be a need to ensure that packet latency is low. For example, an application implementing a feedback control loop operation may require that packets be delivered with minimal delay to maintain a stable system. In other applications, there may be a need to ensure that a packet is delivered within a pre-specified deadline. This allows for the packet to be dropped/discarded if not delivered by the deadline, thus freeing up resources for other packets. The pre-specified deadline may be based, for example, on an application's quality of service (QoS) requirements.

An example approach for reducing delay is to forgo the request-grant mechanism and instead allow subordinate entities to transmit in an unscheduled mode in a distributed manner without waiting for a grant. For example, subordinate entities with packets to send may randomly select a time-frequency resource from an available set of time-frequency resources for transmission. However, such a distributed transmission mechanism becomes problematic if the subordinate entities transmit over the same resource. When such an event occurs, the transmissions from the different subordinate entities may collide, which may consequently impact decoding of the transmissions at the scheduling entity.

In order to reduce or limit collisions, according to an aspect of the present disclosure, the subordinate entities, or their packets, may be prioritized based on an urgency of the packets to be transmitted. For example, an urgency of a packet may be determined according to an amount of time before the packet expires. In more detail, the packet may be associated with a timer and only be valid for a given amount of time, i.e., until the timer counts down to an expiration deadline. In another example, the urgency of the packet may be determined according to an amount of time the packet has been waiting to be transmitted, e.g., the urgency of the packet increases when the timer associated with the packet counts past a certain threshold. In a further example, the urgency of the packet may be determined according to QoS requirements of an end application (e.g., emergency service application). In more detail, the QoS requirements of one application may give higher priority to the one application's packets over the packets of other applications. Such prioritization helps decrease the likelihood of the packets colliding and increase the likelihood of the packets meeting their deadlines.

For packets within the same subordinate entity, the subordinate entity may be able to prioritize one set of packets to be transmitted over another set of packets to be transmitted. For packets at different subordinate entities, information regarding packet deadlines and/or QoS requirements may not be available within a single entity but may be distributed across all the different subordinate entities.

In an example approach, subordinate entities may inform a scheduler at the scheduling entity of a deadline for each packet to be transmitted. This allows the scheduling entity to prioritize the subordinate entities, or their respective packets, according to an urgency of the packets. For example, the scheduling entity may assign a higher priority to subordinate entities having packets with earlier deadlines over subordinate entities having packets with later deadlines. However, this example approach may rely on numerous signaling messages and may result in a large amount of overhead. Moreover, the exchange of messages for conveying the packet deadlines from the subordinate entity to the scheduling entity, followed by the grant from the scheduling entity to the subordinate entity, may introduce a significant amount of delay that limits a user's experience if packet deadline requirements are strict.

Accordingly, the present disclosure provides a mechanism for prioritizing uplink transmissions according to packet deadlines without incurring the overhead and delay associated with subordinate entities communicating packet deadline information to a scheduling entity on a per-packet basis.

Exemplary Description of Conditional Uplink Grant

According to aspects of the present disclosure, a scheduling entity may transmit a grant message to one or more subordinate entities that specifies which resources are granted for an uplink transmission, and further specifies a condition to be satisfied in order for the grant to be applicable. In some examples, the grant message may be pre-emptively transmitted. Thus, the grant message is not necessarily transmitted in response to a scheduling request from a subordinate entity.

In an example, the condition that determines whether the resource is available to use may specify that the grant is only applicable for packets that arrived at the subordinate entity for transmission before a certain time instance. This ensures that older packets are prioritized over newly arrived packets. In another example, the condition may specify that the grant is only applicable for packets whose time remaining before an expiration deadline is within a certain threshold value. This ensures that packets that are close to expiring are prioritized over packets that have more time before expiration.

In an aspect of the present disclosure, the grant message from the scheduling entity may specify that the amount of resources allocated, and/or which resources are available for the subordinate entity's transmission is a function of one or more conditions that the subordinate entity can evaluate. For example, the amount of resources allocated for a subordinate entity's transmission may be dependent on the subordinate entity's evaluation of the time remaining before the expiration deadline of the subordinate entity's packets.

The subordinate entity, upon receiving the grant message, evaluates the condition specified in the grant message and interprets which, if any, resources are granted to the subordinate entity. In some examples, the grant message may be a dedicated grant to one subordinate entity. Alternatively, the grant message may be a common grant to multiple subordinate entities as long as the subordinate entities satisfy specified conditions for reducing or limiting contention. Specifically, multiple subordinate entities may be allowed to share the same uplink resources if all the subordinate entities satisfy the specified conditions. For example, if two subordinate entities have very urgent packets that are about to expire (thus satisfying a specified condition), the two subordinate entities may transmit simultaneously over the same granted resources. If collision occurs, the scheduling entity receiving the transmissions would have to decode the collided transmissions accordingly. Notably, by specifying one or more conditions to be satisfied in order for the grant of resources to be used, the number of subordinate entities that attempt a transmission can be automatically limited, thus limiting the likelihood of a collision.

The grant message may or may not be transmitted from the scheduling entity in response to a scheduling request from the subordinate entity. For example, the grant message that is not transmitted in response to the subordinate entity request may be applicable to specific resources preconfigured in a configuration message on a semi-static timescale, such as through a radio resource control (RRC) message. In another example, the grant message may be configured semi-statically or dynamically in response to the subordinate entity request.

According to aspects disclosed herein, a benefit is realized in that a scheduling entity is allowed to enforce the prioritization of uplink transmissions based on information available at subordinate entities (e.g., packet expiration deadlines) without incurring the delay or overhead associated with the subordinate entities signaling the information to the scheduling entity. Aspects of the disclosure also facilitate the subordinate entities to operate in a distributed manner without the delay inherent in a request-grant mechanism, since the scheduling entity can preemptively send a conditional grant without waiting for a request from the subordinate entity. In an aspect, the conditional grant may be common to multiple subordinate entities. However, the conditions associated with the grant help limit a probability of transmission collisions between the multiple subordinate entities.

Figure 5:
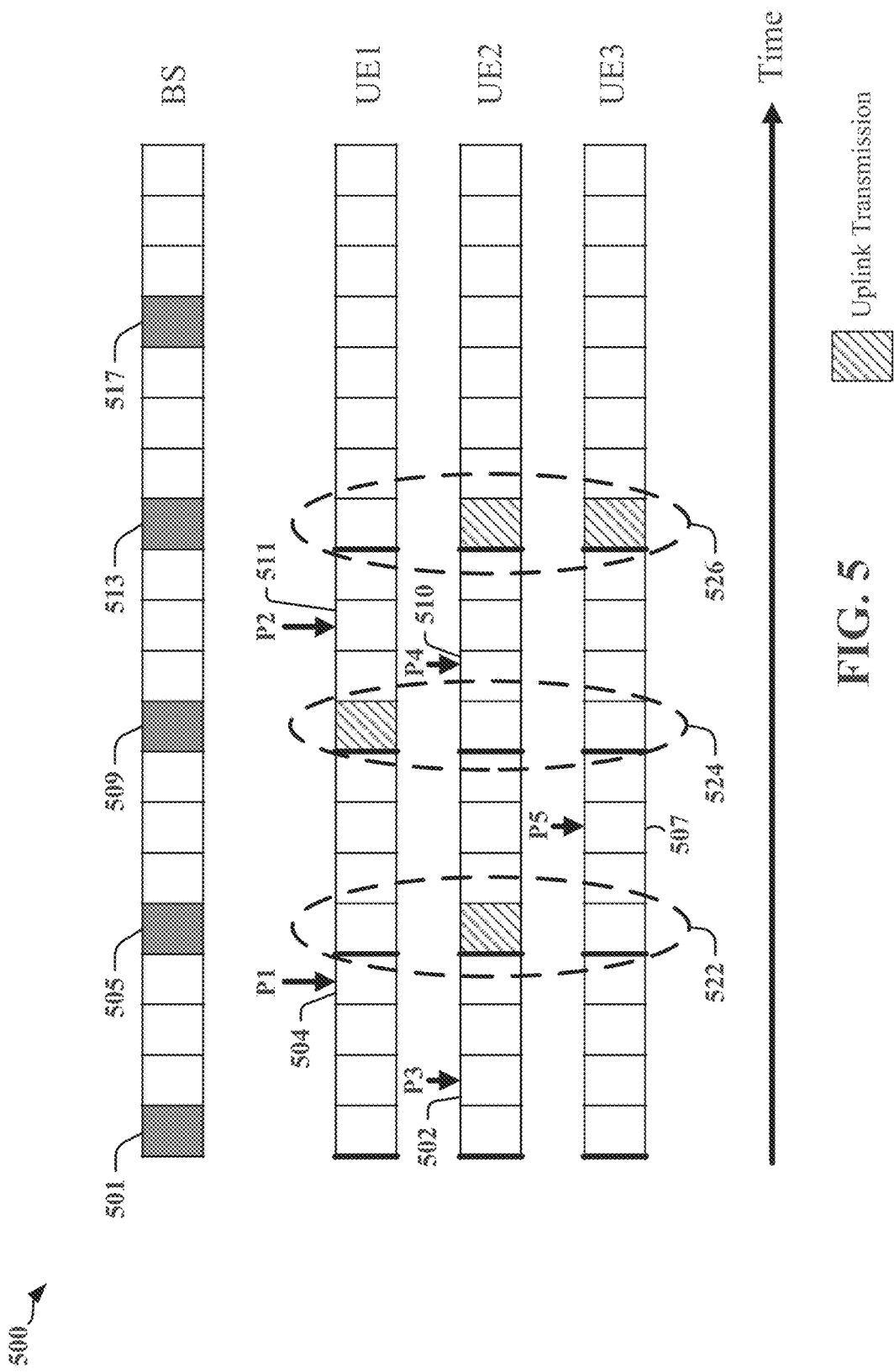
FIG. 5 is a diagram illustrating an example of a conditional grant mechanism/operation, wherein a grant of resources is applicable only to packets that arrived at a subordinate entity for transmission before a certain time instance.

FIG. 5 is a diagram 500 illustrating an example of a conditional grant mechanism/operation, wherein a grant of resources is applicable to packets that arrived at a subordinate entity (e.g., UE) for transmission before a certain time. According to some aspects of the present disclosure, a packet is considered to have arrived at a subordinate entity when the packet is placed into a queue or buffer of the subordinate entity (e.g., in memory 405, see FIG. 4) for transmission. As shown in FIG. 5, shaded time slots 501, 505, 509, 513, and 517 represent resources that are commonly granted by a scheduling entity (e.g., BS) to all subordinate entities (e.g., UE1, UE2, and UE3) under a condition: e.g., for packets that arrived at a subordinate entity more than two symbols (or time slots) in the past. For UE1, a packet P1 arrives for uplink transmission at a time slot 504 and a packet P2 arrives for uplink transmission at a time slot 511. For UE2, a packet P3 arrives for uplink transmission at a time slot 502 and a packet P4 arrives for uplink transmission at a time slot 510. For UE3, a packet P5 arrives for uplink transmission at a time slot 507.

Referring to a first time instance 522, prioritization of UE2's older packet P3 over UE1's newer packet P1 is depicted. As indicated above, in this example the resource granted at time slot 505 is applicable only to packets that arrived at a subordinate entity more than two time slots in the past. As indicated above, the packet P1 arrives at UE1 at the time slot 504. However, the time slot 504 is only one time slot previous to the time slot 505. Hence, the resource granted at the time slot 505 is not applicable to the packet P1 since the packet P1 did not arrive more than two time slots previous to the time slot 505. Accordingly, UE1 is not allowed to transmit the packet P1 using the resource granted at the time slot 505. In some examples, other resources may be made available for the transmission of packet P1, or in other examples, packet P1 may remain queued until a resource is available for its transmission. Regarding UE2, the packet P3 arrives at UE2 at the time slot 502, which is three time slots previous to the time slot 505. Hence, the resource granted at the time slot 505 is applicable to the packet P3 since the packet P3 arrived more than two time slots previous to the time slot 505. Accordingly, UE2 is allowed to transmit the packet P3 using the resource granted at the time slot 505.

Referring to a second time instance 524, prioritization of UE1's older packet P1 over UE3's newer packet P5 is depicted. The resource granted at time slot 509 is applicable to packets that arrived at a subordinate entity more than two time slots in the past. As indicated above, the packet P1 arrives at UE1 at the time slot 504, which is five time slots previous to the time slot 509. Hence, the resource granted at the time slot 509 is applicable to the packet P1 since the packet P1 arrived more than two time slots previous to the time slot 509. Accordingly, UE1 is allowed to transmit the packet P1 using the resource granted at the time slot 509. Regarding UE3, the packet P5 arrives at UE3 at the time slot 507. However, the time slot 507 is only two time slots previous to the time slot 509. Hence, the resource granted at the time slot 509 is not applicable to the packet P5 since the packet P5 did not arrive more than two time slots previous to the time slot 509. Accordingly, UE3 is not allowed to transmit the packet P5 using the resource granted at the time slot 509.

Referring to a third time instance 526, prioritization of UE2's older packet P4 and UE3's older packet P5 over UE1's newer packet P2 is depicted. The resource granted at time slot 513 is applicable to packets that arrived at a subordinate entity more than two time slots in the past. As indicated above, the packet P2 arrives at UE1 at the time slot 511. However, the time slot 511 is only two time slots previous to the time slot 513. Hence, the resource granted at the time slot 513 is not applicable to the packet P2 since the packet P2 did not arrive more than two time slots previous to the time slot 513. Accordingly, UE1 is not allowed to transmit the packet P2 using the resource granted at the time slot 513. Regarding UE2, the packet P4 arrives at UE2 at the time slot 510, which is three time slots previous to the time slot 513. Hence, the resource granted at the time slot 513 is applicable to the packet P4 since the packet P4 arrived more than two time slots previous to the time slot 513. Accordingly, UE2 is allowed to transmit the packet P4 using the resource granted at the time slot 513. Regarding UE3, the packet P5 arrives at UE3 at the time slot 507, which is six time slots previous to the time slot 513. Hence, the resource granted at the time slot 513 is also applicable to the packet P5 since the packet P5 arrived more than two time slots previous to the time slot 513. Accordingly, UE3 is allowed to also transmit the packet P5 using the resource granted at the time slot 513. Still referring to the third time instance 526, the conditional grant mechanism/operation allows older packets P4 and P5 to be transmitted by UE2 and UE3, respectively, using the same resource granted at the time slot 513 even though these packet transmissions may possibly collide. However, because the conditional grant mechanism/operation does not allow newer packet P2 to be transmitted by UE1, in this instance the conditional grant mechanism/operation avoids a possible three-way collision. Here, any suitable multiple access scheme may be utilized for the scheduling entity to resolve the transmissions from UE2 and UE3, including but not limited to the utilization of different scrambling codes for the respective packets, active interference cancellation at the scheduling entity, etc.

In a further aspect of the disclosure, a packet arriving at a subordinate entity for transmission may be marked to be transmitted using a grant mechanism/operation different from the conditional grant mechanism/operation described above. Such a packet may be a low-priority packet or a packet without an expiration deadline, and therefore transmitted using a different type of resource grant. In this way, packet collisions may be further reduced or avoided, as fewer packets may be likely to be transmitted in the conditionally granted resources.

Figure 6:
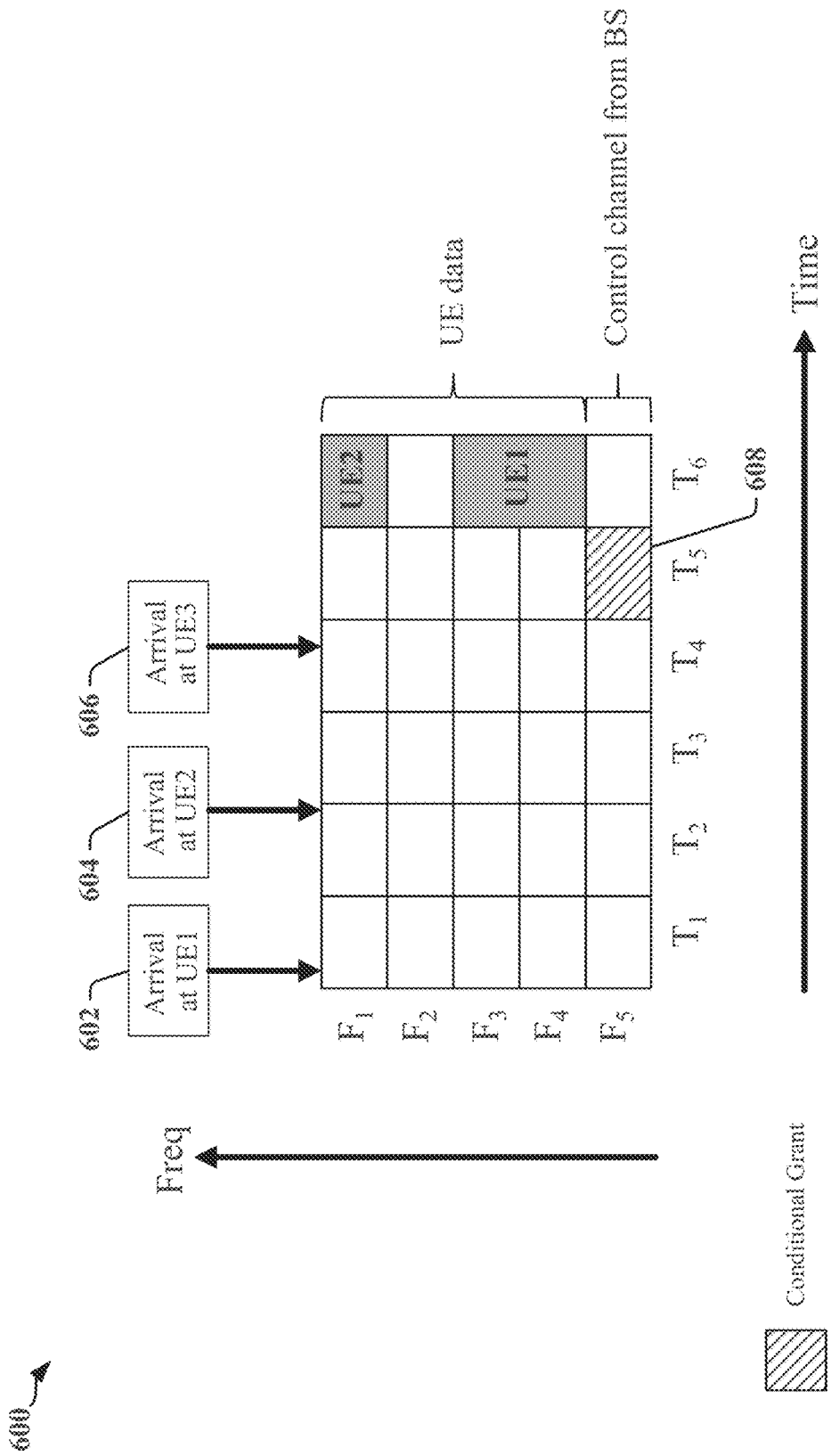
FIG. 6 is a diagram illustrating another example of a conditional grant mechanism/operation, wherein an amount of resources allocated for an uplink transmission is a function of one or more conditions to be satisfied.

FIG. 6 is a diagram 600 illustrating another example of a conditional grant mechanism/operation, wherein an amount of resources allocated for an uplink transmission is a function of one or more conditions to be satisfied. The one or more conditions may be evaluated by a subordinate entity (e.g., UE). In the diagram 600, time is represented in the horizontal dimension divided into a number of timeslots T while frequency is represented in the vertical dimension divided into a number of subcarriers F. The timeslots T and the subcarriers F combine to form a grid of time-frequency resource elements.

At a first time instance 602, one or more packets arrive at a first subordinate entity (UE1) during a first time slot $T_1$. At a second time instance 604, one or more packets arrive at a second subordinate entity (UE2) during a second time slot $T_2$. At a third time instance 606, one or more packets arrive at a third subordinate entity (UE3) during a fourth time slot $T_4$. At a fourth time instance 608, a scheduling entity (BS) sends a conditional grant message to all subordinate entities (e.g., UE1, UE2, and UE3) during a fifth time slot $T_5$.

A single conditional grant message may indicate resources to be used for an uplink transmission as well as one or more conditions for determining whether a subordinate entity is allowed to transmit packets using the resources. Alternatively, the resources to be used for the uplink transmission and the one or more conditions for allowing use of the resources may be indicated via separate conditional grant messages. An amount of resources granted to the subordinate entity for transmitting the packets may be dependent on the satisfaction of the one or more conditions.

For example, the conditional grant message may indicate or identify frequency resources during a sixth time slot T6 as the resources to be used by UE1, UE2, and/or UE3 for an uplink transmission. However, use of the indicated frequency resources and an amount of frequency resources allocated for uplink transmission may depend on which one of the indicated conditions is satisfied.

According to one non-limiting example, the conditions may be as follows:

1) Subordinate entities (UEs) with packets that arrived before the end of the first time slot $T_1$ are allowed to randomly choose two frequency resources during the sixth time slot $T_6$ to transmit such packets;

2) Subordinate entities (UEs) with packets that arrived after the end of the first time slot $T_1$ but before the end of the third time slot $T_3$ are allowed to randomly choose one frequency resource during the sixth time slot $T_6$ to transmit such packets: and 3) Subordinate entities (UEs) with packets that arrived after the end of the third time slot $T_3$ are not allowed to use any frequency resource during the sixth time slot $T_6$ to transmit such packets.

In this example, each of the subordinate entities (UE1, UE2, and UE3) may evaluate the conditions and determine if it is allowed to transmit packets using the identified resources. Referring back to the first time instance 602 of FIG. 6, packets arrive at UE1 before the end of the first time slot $T_1$. Accordingly, UE1 may determine that Condition 1 is satisfied and is therefore allowed to randomly choose two frequency resources during the sixth time slot $T_6$ to transmit such packets. In the example shown in FIG. 6, UE1 selects two frequency resources $F_3$ and $F_4$ during the sixth time slot $T_6$ for the uplink transmission.

Referring back to the second time instance 604 of FIG. 6, packets arrive at UE2 after the end of the first time slot $T_1$ but before the end of the third time slot $T_3$. Accordingly, UE2 may determine that Condition 2 is satisfied and is therefore allowed to randomly choose one frequency resource during the sixth time slot $T_6$ to transmit such packets. In the example shown in FIG. 6, UE2 selects the frequency resource $F_1$ during the sixth time slot $T_6$ for the uplink transmission.

Referring back to the third time instance 606 of FIG. 6, packets arrive at UE3 after the end of the third time slot $T_3$. Accordingly, UE3 may determine that Condition 3 is satisfied and is therefore not allowed to use any frequency resource during the sixth time slot $T_6$ to transmit such packets. Hence, in the example shown in FIG. 6, UE3 is not shown to perform an uplink transmission.

As described above, UE1 and UE2 satisfy certain conditions that allow use of frequency resources during the sixth time slot $T_6$, while UE3 does not satisfy the condition that would allow use of such resources. Without such conditions, and when dealing with a contention-based resource, all three subordinate entities (UE1, UE2, and UE3) may have attempted an uplink transmission in a distributed manner without coordination, and therefore, a collision between the uplink transmissions would be more likely. However, by requiring satisfaction of a certain condition before a subordinate entity is allowed to transmit packets using granted resources, the amount of traffic on the granted resources is restricted lessening the likelihood of collision.

As described above with respect to FIG. 6, the resources referenced by the conditional grant message may relate to frequency resources during a particular time slot. However, according to other aspects of the present disclosure, it is contemplated that the resources referenced by the conditional grant message may include other types of resources. For example, the resources may relate to time resources, spatial resources, transmit power, etc.

As described above with respect to FIGS. 5 and 6, the conditions for using granted resources may relate to packets that arrive at a subordinate entity (UE) for transmission before a particular time instance or during a particular time interval. However, according to other aspects of the present disclosure, it is contemplated that the conditions are not necessarily so limited. For example, a condition may relate to packets whose time remaining before an expiration deadline is within a certain threshold value or an amount of time elapsed since the packets arrived at a subordinate entity's queue ready for transmission. In another example, a condition may relate to whether a packet is associated with an application of a certain quality of service (QoS) class. If so, such packet may be given transmission priority over other packets associated with applications of different QoS classes. In a further example, a condition may relate to an amount of battery life remaining at a subordinate entity. Accordingly, packets of a subordinate entity near an end of battery life, or having a battery life below a threshold, may be given transmission priority over packets of subordinate entities having higher amounts of battery life. In another example, a condition may relate to an emergency action. Hence, packets of a subordinate entity related to an emergency situation (e.g., distress call, disaster alert, etc.) may be given transmission priority over non-emergency packets. In further examples, conditions may relate to any other suitable condition for access to the conditionally granted resources.

Exemplary Description of Data Scheduling Across Different Resources

Services in a fifth-generation (5G) network (e.g., a mission critical service, a wide area network-Internet of Everything (WAN-IoE) service, and an evolved mobile broadband (eMBB) service) may have different service requirements. Hence, it may be unlikely that one physical layer (PHY) channel can satisfy all of the 5G services' requirements simultaneously. To compensate, the 5G network may deploy more than one PHY channel, wherein each PHY channel is fine-tuned for a specific service. Accordingly, a procedure for selecting a PHY channel may be defined.

One PHY channel (e.g., eMBB PHY) may satisfy more than one service's requirements (e.g., eMBB requirements and WAN-IOE requirements). If so, the services' payloads may be aggregated into one transport block (TrBlk), i.e., one MAC PDU. Therefore, a MAC PDU multiplexing rule may also be defined.

Figure 7:
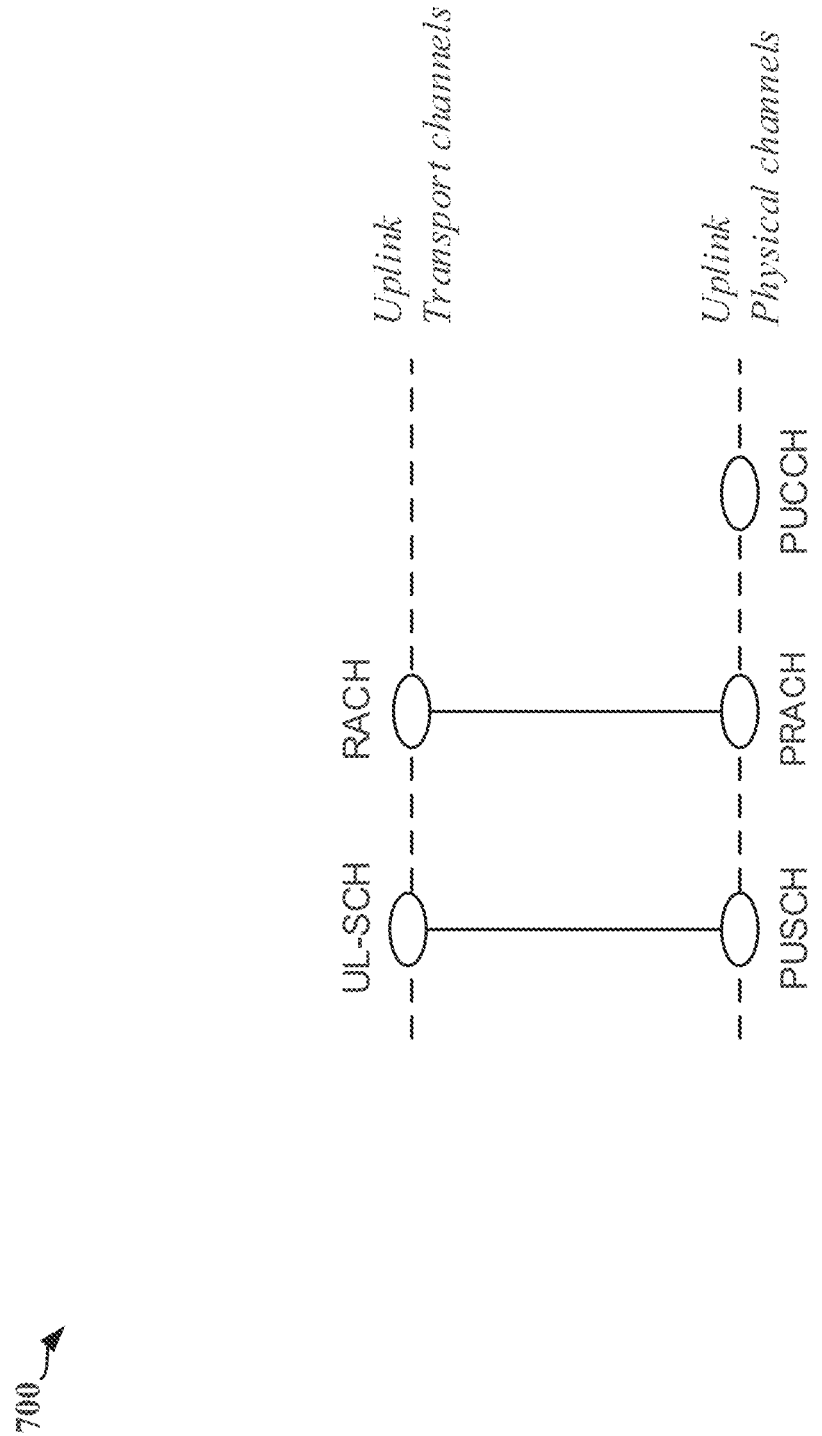
FIG. 7 is a diagram illustrating a mapping between uplink transport channels and uplink physical channels in an LTE network.

FIG. 7 is a diagram 700 illustrating a mapping between certain uplink transport channels and uplink physical channels in an LTE network. The uplink transport channels may include an uplink shared channel (UL-SCH) and a random access channel (RACH). The uplink physical channels may include a physical uplink shared channel (PUSCH), a physical random access channel (PRACH), and a physical uplink control channel (PUCCH). These channels are provided to illustrate one example of mapping between transport and physical channels.

Figure 8:
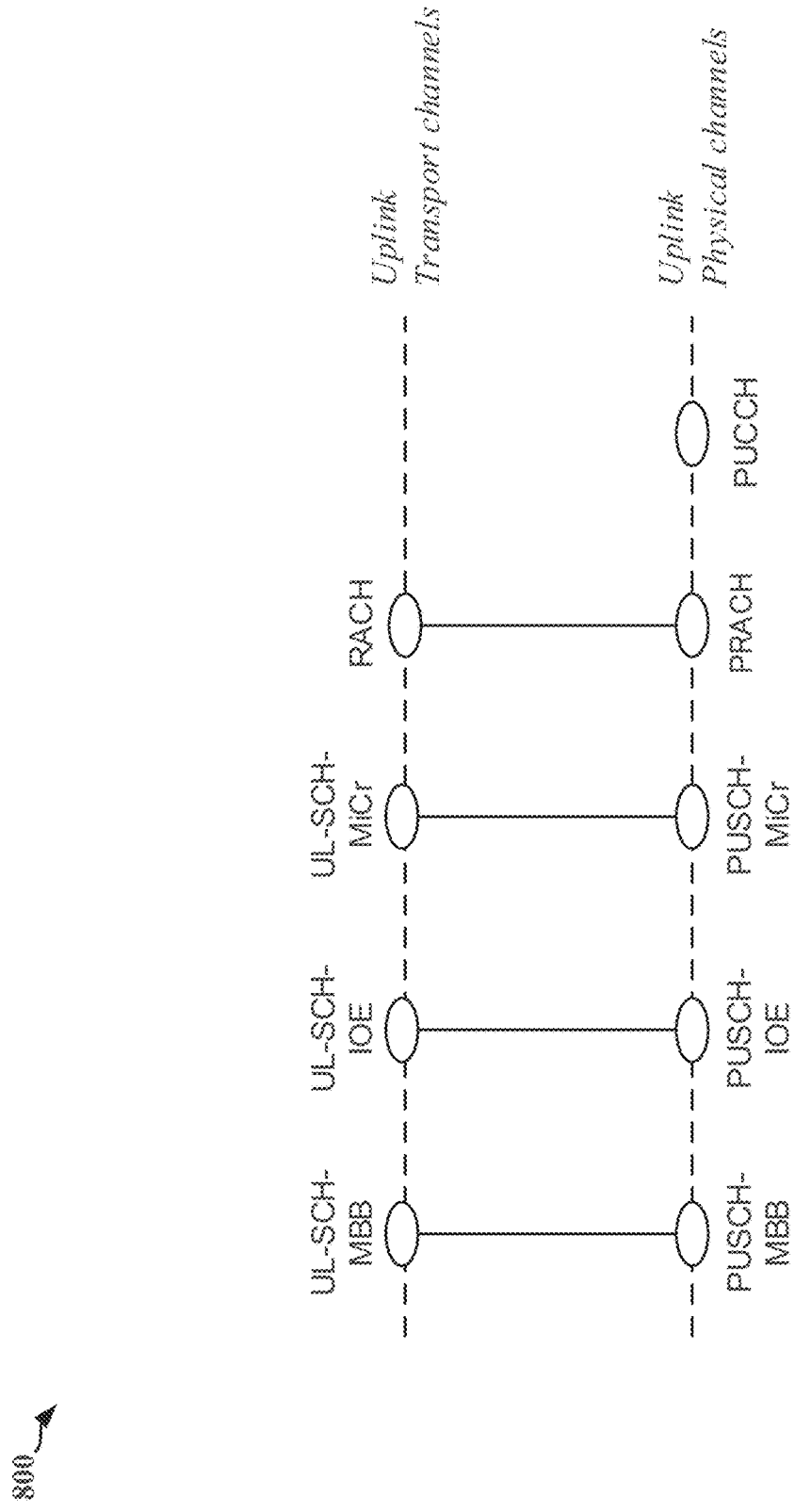
FIG. 8 is a diagram illustrating a mapping between uplink transport channels and uplink physical channels in a 5G network.

FIG. 8 is a diagram 800 illustrating a mapping between certain uplink transport channels and uplink physical channels in an exemplary network (e.g., a 5G network). The uplink transport channels may include a mobile broadband uplink shared channel (UL-SCH-MBB), an Internet of Everything uplink shared channel (UL-SCH-IOE), a mission critical uplink shared channel (UL-SCH-MiCr), and a random access channel (RACH). The uplink physical channels may include a mobile broadband physical uplink shared channel (PUSCH-MBB), an Internet of Everything physical uplink shared channel (PUSCH-IOE), a mission critical physical uplink shared channel (PUSCH-MiCr), a physical random access channel (PRACH), and a physical uplink control channel (PUCCH).

Figure 9:
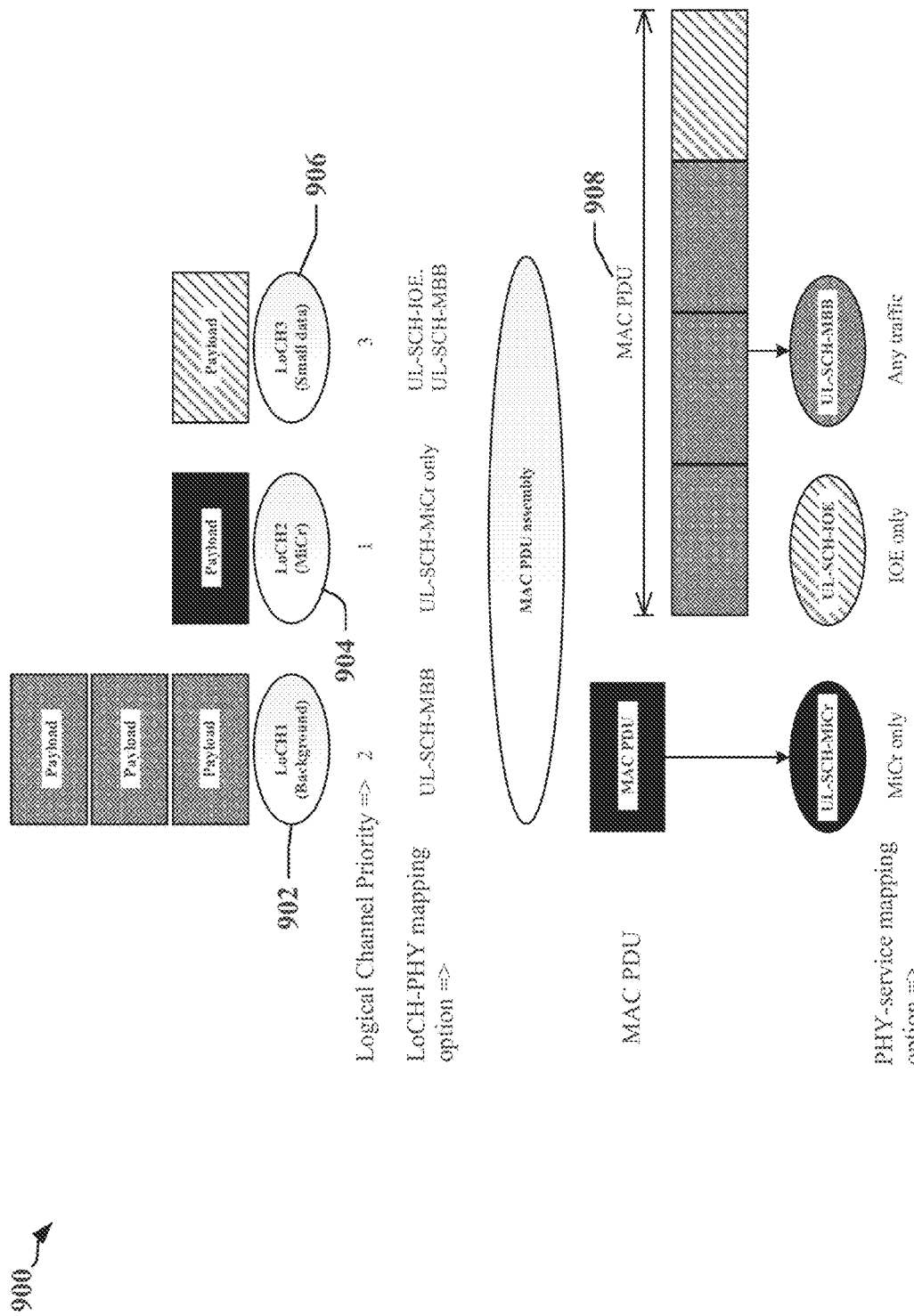
FIG. 9 is a diagram illustrating service-based PHY channel selection and MAC PDU multiplexing.

FIG. 9 is a diagram 900 illustrating service-based PHY channel selection and MAC PDU multiplexing. A first logical channel LoCH1 902 may carry background data for an uplink transmission. A second logical channel LoCH2 904 may carry MiCr service data for an uplink transmission. A third logical channel LoCH3 906 may carry a small amount of data (small data) for an uplink transmission. In an aspect of the disclosure, a device may receive a configuration for transmitting the different types of data carried on the different types of logical channels. The configuration may indicate logical channel priorities. For example, the second logical channel LoCH2 904 may have a highest priority 1 for transmitting the MiCr service data, the first logical channel LoCH1 902 may have a second highest priority 2 for transmitting the background data, and the third logical channel LoCH3 906 may have a third highest priority 3 for transmitting the small data.

Additionally or alternatively, the configuration may provide a logical channel-to-physical channel (LoCH-PHY) mapping option. The LoCH-PHY mapping option indicates which physical channel(s) may be used to transmit data of a particular logical channel. For example, the LoCH-PHY mapping option may indicate that the device may use the transport channel UL-SCH-MBB mapped to the physical channel PUSCH-MBB to transmit the background data of the first logical channel LoCH1 902. In another example, the LoCH-PHY mapping option may indicate that the device can only use the transport channel UL-SCH-MiCr mapped to the physical channel PUSCH-MiCr to transmit the MiCr service data of the second logical channel LoCH2 904. In a further example, the LoCH-PHY mapping option may indicate that the device may use either the transport channel UL-SCH-IOE mapped to the physical channel PUSCH-IOE or the transport channel UL-SCH-MBB mapped to the physical channel PUSCH-MBB to transmit the small data of the third logical channel LoCH3 906.

Additionally or alternatively, the configuration may provide a physical channel-to-service (PHY-service) mapping option. The PHY-service mapping option indicates what type(s) of service data may be transmitted on a particular physical channel. For example, the PHY-service mapping option may indicate that the transport channel UL-SCH-MiCR mapped to the physical channel PUSCH-MiCr may be used to only transmit MiCr service data. In another example, the PHY-service mapping option may indicate that the transport channel UL-SCH-IOE mapped to the physical channel PUSCH-IOE may be used to only transmit IOE service data. In a further example, the PHY-service mapping option may indicate that the transport channel UL-SCH-MBB mapped to the physical channel PUSCH-MBB may be used to transmit any type of service data. Accordingly, as shown in FIG. 9, the service payload (background data) of the first logical channel LoCH1 902 and the service payload (small data) of the third logical channel LoCH3 906 may be aggregated into one MAC PDU for transmission via the transport channel UL-SCH-MBB mapped to the physical channel PUSCH-MBB.

Figure 10:
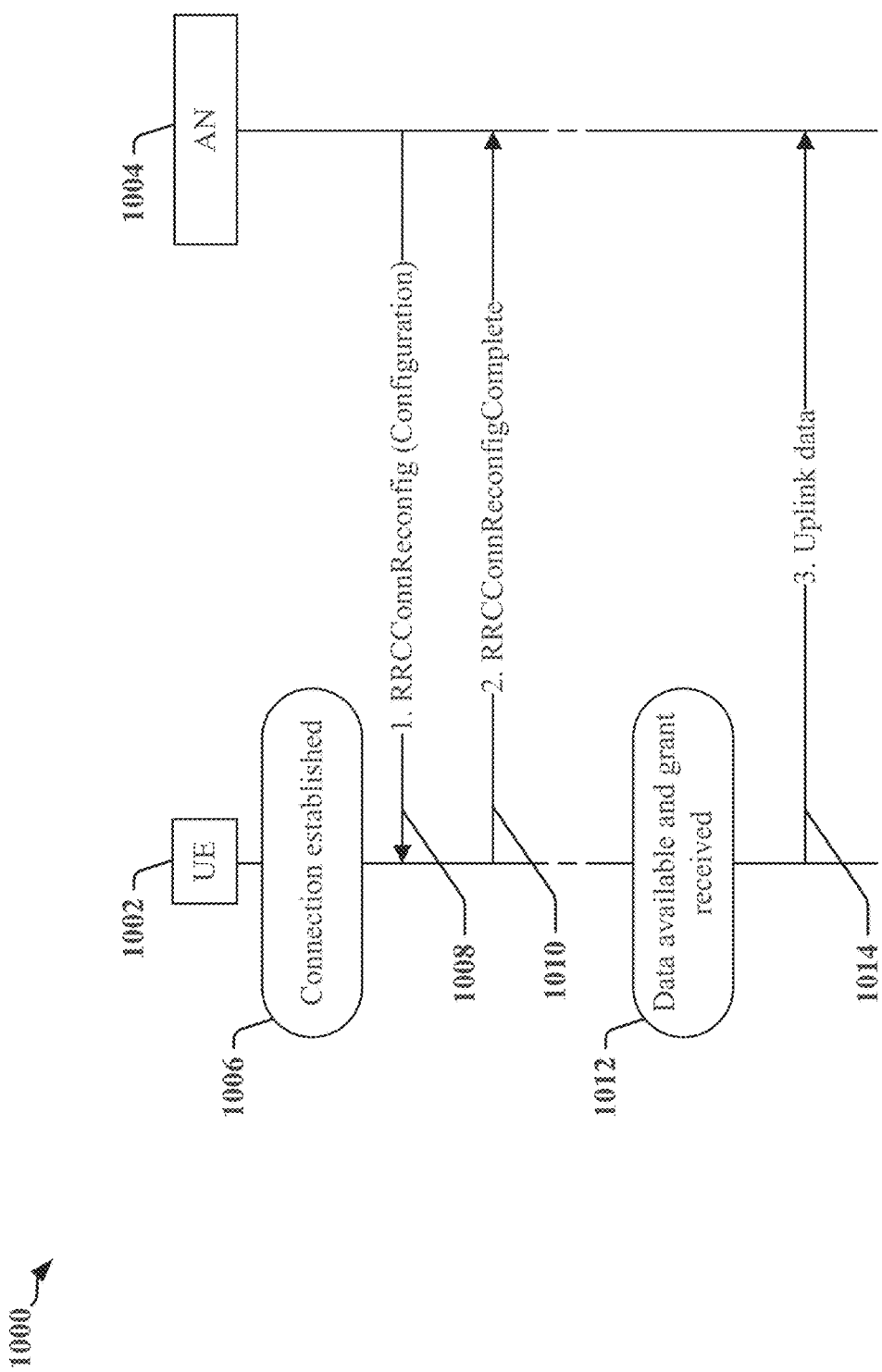
FIG. 10 is a diagram illustrating radio resource control (RRC) procedures between a user equipment (UE) and an access network (AN).

FIG. 10 is a diagram 1000 illustrating radio resource control (RRC) procedures between a user equipment (UE) (e.g., subordinate entity) 1002 and an access network (AN) (e.g., scheduling entity) 1004. Based on the performance of the RRC procedures, the UE 1002 may determine which types of data traffic are mapped to which PHY channels for an uplink transmission.

At 1006, the UE 1002 establishes a connection with the AN 1004. Thereafter, the UE 902 and the AN 1002 perform RRC configuration procedures. For example, at 1008, the UE 1002 receives a configuration message (RRCConnReconfig) 1008 from the AN 1004. The configuration message may include a resource configuration indicating what types of data traffic are allowed to be transmitted on particular types of physical (PHY) channels. At 1010, the UE 1002 may respond by sending a configuration complete message (RRCConReconfigComplete) to the AN 1004. At 1012, the UE 1002 may determine the existence of data for an uplink transmission and receive a grant of resources (PHY channels) for the uplink transmission. At 1014, the UE 1002 transmits the data to the AN 1004 based on the granted PHY channels and the resource configuration indicating what types of data traffic are allowed to be transmitted on the granted PHY channels.

In an aspect of the disclosure, the resource configuration indicates the types of data traffic allowed to be transmitted on the particular types of PHY channels according to two options. According to a first option (Option 1), each bearer or logical channel is associated with one or more PHY channels. Three possible values for each bearer or logical channel are:

1) Only—traffic for the bearer shall only use the PHY channel to send data on the uplink;
2) Allowed—traffic for the bearer may use the PHY channel to send data on the uplink; and
3) Prohibited—traffic for the bearer may not use the PHY channel to send data on the uplink.

An information element (IE) within a configuration message may be used to indicate the one or more PHY channels corresponding to the bearer or logical channel. For example, an IE used to setup, modify, and/or release radio bearers may be used to indicate the one or more PHY channels that correspond to the bearer or logical channel.

In an aspect of the disclosure, a configuration message (e.g., RadioResourceConfigDedicated message) may include the following fields: 1) PUSCH-MBB-scheduling; 2) PUSCH-IOE-scheduling; and 3) PUSCH-MICR-scheduling.

For data radio bearers (DRBs), the PUSCH-MBB-scheduling field is used to indicate whether data for a corresponding DRB: a) shall be routed over the PUSCH-MBB channel only; b) is allowed to be routed over the PUSCH-MBB channel; or c) may not be routed over the PUSCH-MBB channel. If the PUSCH-MBB-scheduling field is set to "only," then the PUSCH-IOE-scheduling field and the PUSCH-MICR-scheduling field shall be set to prohibited.

For DRBs, the PUSCH-IOE-scheduling field is used to indicate whether data for a corresponding DRB; a) shall be routed over the PUSCH-IOE channel only; b) is allowed to be routed over the PUSCH-IOE channel; or c) may not be routed over the PUSCH-IOE channel. If the PUSCH-IOE-scheduling field is set to "only," then the PUSCH-MBB-scheduling field and the PUSCH-MICR-scheduling field shall be set to prohibited.

For DRBs, the PUSCH-MICR-scheduling field is used to indicate whether data for a corresponding DRB: a) shall be routed over the PUSCH-MICR channel only; b) is allowed to be routed over the PUSCH-MICR channel; or c) may not be routed over the PUSCH-MICR channel. If the PUSCH-MICR-scheduling field is set to "only," then the PUSCH-IOE-scheduling field and the PUSCH-MBB-scheduling field shall be set to prohibited.

According to a second option (Option 2), each PHY channel is configured with one or more types of traffic, e.g., based on a quality of service (QoS) requirement. An IE within a configuration message (e.g., RadioResourceConfigCommon) may be used to configure a PHY channel for different types of traffic. For example, an IE used to configure a default PUSCH may be used to configure additional PUSCHs different from the default PUSCH. The default PUSCH may be used for any type of traffic unless a logical channel configuration prohibits such use. Moreover, an additional PUSCH may be associated with a list of service identifiers/QoS class identifiers (QCIs) that indicates what type(s) of traffic can be sent over a corresponding PUSCH.

In an aspect of the disclosure, Option 1 may be implemented in conjunction with Option 2. Accordingly, Option 1 may be modified when used with Option 2 such that one or more PHY channels corresponding to a bearer or logical channel is indicated via a service identifier/QoS class identifier (QCI) in a configuration message. As such, each bearer or logical channel is associated with one or more PHY channels. Three possible values for each bearer are:

1) Only—traffic for that bearer shall only use the PHY channel to send data on the uplink;

2) Allowed—traffic for the bearer may use the PHY channel to send data on the uplink; and 3) Prohibited—traffic for the bearer may not use the PHY channel to send data on the uplink.

An information element (IE) within a configuration message may be used to indicate the one or more PHY channels corresponding to the bearer or logical channel. For example, an IE used to setup, modify, and/or release radio bearers may include the service identifier/QCI indicating the one or more PHY channels that correspond to the bearer or logical channel.

According to aspects of the disclosure, if more than one type of resource (e.g., uplink channel) is available to the UE for a transmission, the UE may select the resource on which to transmit based on a service type or QoS requirement of the packet to be transmitted. If the UE receives different types of grants, e.g., a contention-based grant and a normal grant, different resources corresponding to the different grants may be used for different packet service types or QoS requirements. For example, one resource may be configured for high reliability while another resource may be configured for high throughput. Accordingly, selection of which resource to use may be made on a per-packet basis, e.g., based on the packet and resource characteristics. According to other aspects of the disclosure, the UE may select the resource on which to transmit based on which resource is more efficient to utilize or based on a mapping (e.g., received in a configuration message) between a packet's service type and a resource type.

Aspects of the present disclosure also apply to non-contention-based resources. For example, a UE may receive two non-contention-based grants. Accordingly, the UE may still need to select which resource to use based on an evaluation of one or more conditions (e.g., packet type, reliability, etc.).

Figure 11:
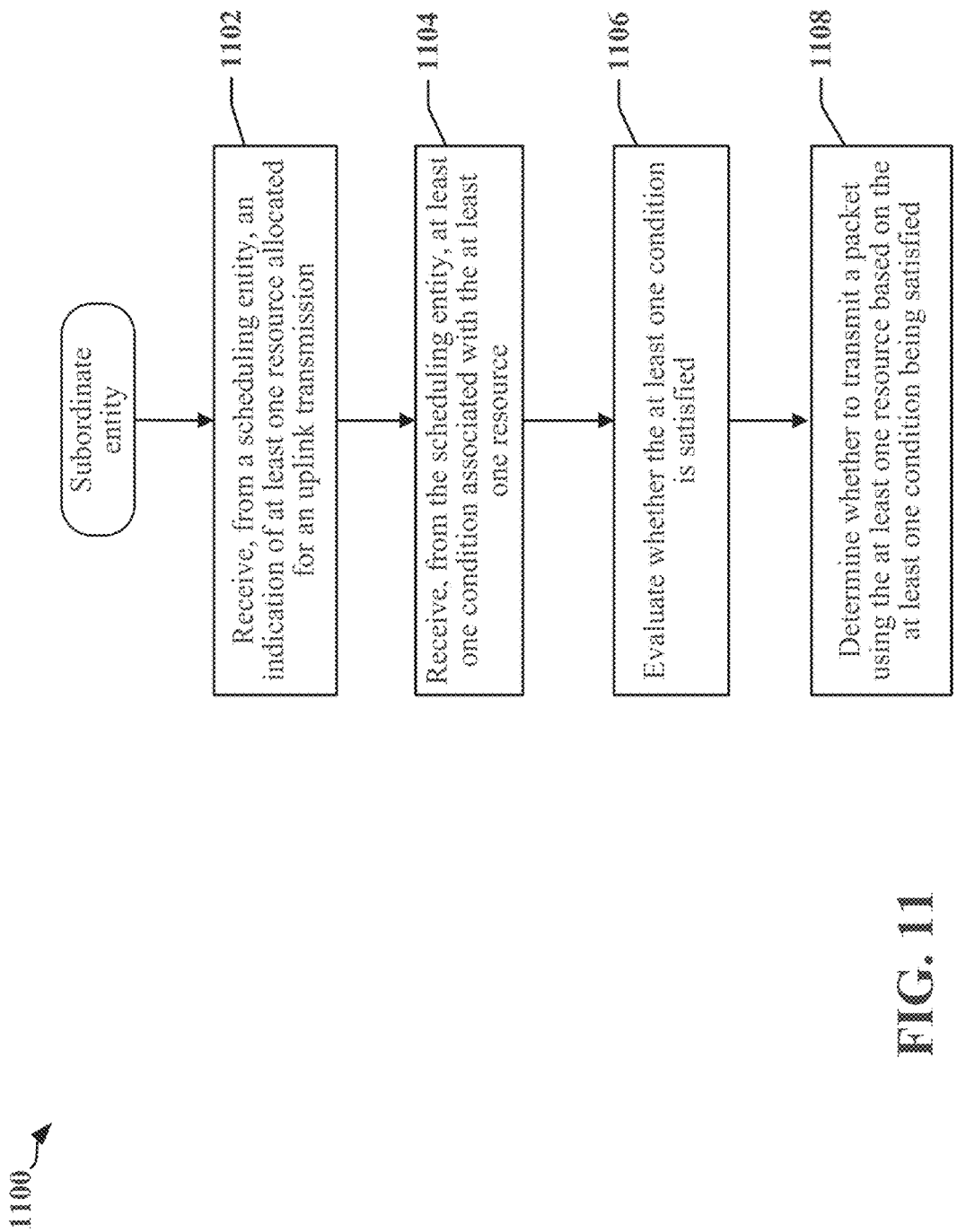
FIG. 11 is a first flow chart of a method of wireless communication.

FIG. 11 is a flow chart 1100 of a method of wireless communication. The method may be performed by a subordinate entity (or subordinate device), e.g., the subordinate entity 204 or any other suitable apparatus or means for carrying out the described functions.

At block 1102, the subordinate entity may receive an indication from a scheduling entity. The indication indicates at least one resource allocated for an uplink transmission. The indication may be received via a unicast message based on a cell radio network identifier (CRNTI) associated with the subordinate entity. Alternatively, the indication may be received via a broadcast message. According to aspects of the disclosure, the indication may be a semi-static allocation received via a unicast message (e.g., via a radio resource control (RRC) message) or via a broadcast message (e.g., via a system information block (SIB)). Moreover, the indication may be a dynamic allocation received via a unicast, broadcast, or multicast message. For example, the indication may be received dynamically via a physical downlink control channel (PDCCH) as a grant associated with a service or a group of UEs using a group radio network identifier (GRNTI) associated with the group of UEs. In an aspect, the at least one resource is a frequency resource, a time resource, a transmit power allocation and/or a spatial resource.

At block 1104, the subordinate entity may receive, from the scheduling entity, at least one condition associated with the at least one resource. In an example, the at least one condition may include information related to whether or not the subordinate entity may use the at least one resource, information regarding an amount of the at least one resource the subordinate entity may use, and/or information regarding different resources which the subordinate entity may select for the uplink transmission. The at least one condition may be included in the indication. For example, the indication may include a threshold timer value. The at least one condition may be associated with a service or the subordinate entity based on configuration information.

As described above, the subordinate entity first receives the indication of the at least one resource (block 1102) prior to receiving the at least one condition associated with the at least one resource (block 1104). However, in alternative aspects of the present disclosure, it is contemplated that at block 1102, the subordinate entity may first receive the at least one condition associated with the at least one resource prior to receiving the indication of the at least one resource at block 1104.

At block 1106, the subordinate entity may evaluate whether the at least one condition is satisfied. At block 1108, the subordinate entity may determine whether to transmit a packet using the at least one resource based on the at least one condition being satisfied.

The at least one condition may relate to packets arriving at the subordinate entity for transmission before a first time instance, packets arriving at the subordinate entity for transmission during a time interval, packets arriving at the subordinate entity for transmission after a second time instance, packets having less than a threshold amount of time remaining before a packet expiration deadline, an amount of battery life remaining at the subordinate entity, an emergency action, and/or a quality of service class to which packets belong.

In an aspect of the disclosure, the evaluating at block 1106 includes evaluating whether the packet arrived at the subordinate entity before the first time instance, and the determining at block 1108 includes transmitting the packet using the at least one resource if the packet arrived at the subordinate entity before the first time instance and refraining from transmitting the packet using the at least one resource if the packet did not arrive at the subordinate entity before the first time instance.

In a further aspect of the disclosure, the evaluating at block 1106 includes evaluating whether the packet arrived at the subordinate entity during the time interval, and the determining at block 1108 includes transmitting the packet using the at least one resource if the packet arrived at the subordinate entity during the time interval and refraining from transmitting the packet using the at least one resource if the packet did not arrive at the subordinate entity during the time interval.

In another aspect of the disclosure, the evaluating at block 1106 includes evaluating whether the packet arrived at the subordinate entity after the second time instance, and the determining at block 1108 includes refraining from transmitting the packet using the at least one resource if the packet arrived at the subordinate entity after the second time instance.

The indication may further indicate an amount of the at least one resource allocated for the uplink transmission, wherein the amount is dependent on the at least one condition. For example, a first number of resources may be allocated for transmitting packets that arrived at the subordinate entity before the first time instance, a second number of resources may be allocated for transmitting packets that arrived at the subordinate entity during the time interval, and no resources may be allocated for transmitting packets that arrived at the subordinate entity after the second time instance.

In an aspect of the disclosure, the evaluating at block 1106 includes determining one or more logical channels allowed to use the at least one resource for packet transmissions, and the determining at block 1108 includes transmitting the packet if the packet is associated with the determined one or more logical channels using the at least one resource. The determination of the one or more logical channels may include determining whether any packet from the one or more logical channels is allowed, required, or prohibited to be transmitted on the at least one resource.

The indication may indicate a type of the at least one resource allocated. The type of the at least one resource may be mapped to one or more services (e.g., IOE service, MBB service, or MiCr service). For example, the indication may be a general allocation of resources for a service (e.g., IOE service) to allow any subordinate entity with small data to transmit in a contention-based manner.

In an aspect of the disclosure, the at least one condition received at block 1104 may be received via a configuration indicating whether the packet is allowed, required, or prohibited to be transmitted on the at least one resource. The configuration may be included in the indication received at block 1102. Thus, the configuration may be valid on a per-grant basis (per-indication basis) based on grant contents (indication contents). Additionally or alternatively, the subordinate entity may receive the configuration via a configuration message received separately from the indication.

The configuration may include a logical channel-to-physical channel (LoCH-PHY) map indicating one or more physical channels allowed to be used for transmitting packets of a corresponding logical channel, or indicating one or more physical channels not allowed to be used for transmitting packets of a corresponding logical channel. Additionally or alternatively, the configuration may include a physical channel-to-service (PHY-service) map indicating one or more types of service data allowed to be transmitted via a corresponding physical channel, or one or more types of service data not allowed to be transmitted via a corresponding physical channel.

The subordinate entity may receive the configuration via a unicast message (e.g., as part of a link or bearer configuration message) or via a broadcast message (e.g., as part of system information). The subordinate entity may also receive the configuration via a bearer establishment procedure. For example, the configuration may be received in a non-access stratum (NAS) so that the configuration is received once, and therefore, the configuration is not configured by a cell but by a network. The subordinate entity may further receive the configuration via an application associated with the packet. For example, the application may specify which resources to use.

In an aspect of the disclosure, the indication may indicate at least two types of resources (e.g., contention-based grant and normal grant) allocated for the uplink transmission. Accordingly, the determining at block 1108 may include selecting one of the at least two types of resources based on the at least one condition (e.g., packet service type, resource type, QoS requirement, etc.) received at block 1104 if a logical channel configured to transmit the packet satisfies the at least one condition, and transmitting the packet using the selected type of resource.

Figure 12:
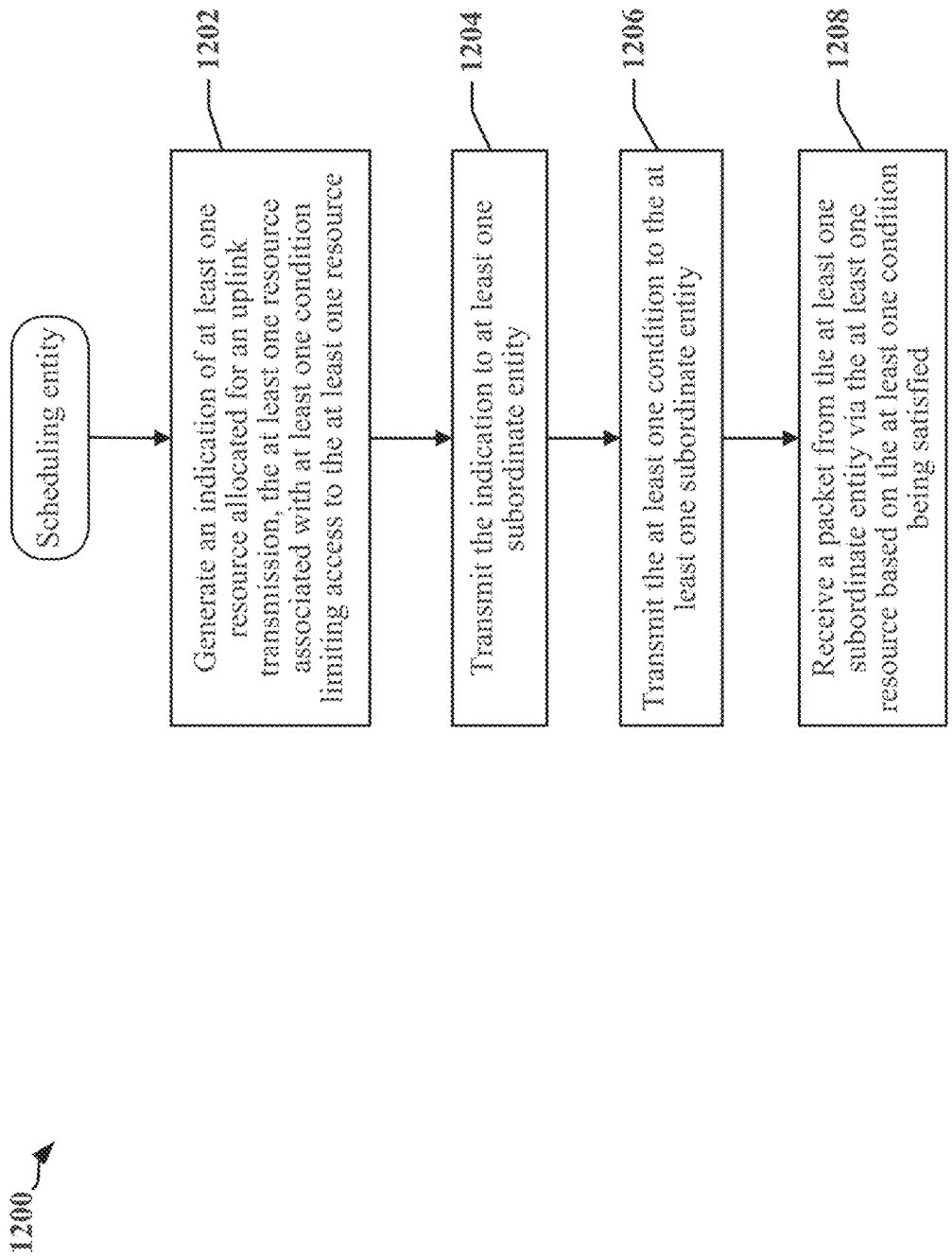
FIG. 12 is a second flow chart of a method of wireless communication.

FIG. 12 is a flow chart 1200 of a method of wireless communication. The method may be performed by a scheduling entity, e.g., the scheduling entity 202 or any other suitable apparatus or means for carrying out the described functions.

At block 1202, the scheduling entity may generate an indication. The indication indicates at least one resource allocated for an uplink transmission, the at least one resource associated with at least one condition limiting access to the at least one resource. In an aspect, the at least one resource is a frequency resource, a time resource, a transmit power allocation, and/or a spatial resource.

At block 1204, the scheduling entity may transmit the indication to the at least one subordinate entity. The indication may be a dedicated grant transmitted via a unicast message based on a cell radio network identifier (CRNTI) associated with a subordinate entity. Alternatively, the indication may be a common grant transmitted via a broadcast message to more than one subordinate entity. According to aspects of the disclosure, the indication may be a semi-static allocation transmitted via a unicast message (e.g., via a radio resource control (RRC) message) or via a broadcast message (e.g., via a system information block (SIB)). Moreover, the indication may be a dynamic allocation transmitted via a unicast, broadcast, or multicast message. For example, the indication may be transmitted dynamically via a physical downlink control channel (PDCCH) as a grant associated with a service or a group of UEs using a group radio network identifier (GRNTI) associated with the group of UEs.

At block 1206, the scheduling entity may transmit the at least one condition to the at least one subordinate entity. In an example, the at least one condition may include information related to whether or not the at least one subordinate entity may use the at least one resource, information regarding an amount of the at least one resource the at least one subordinate entity may use, and/or information regarding different resources which the at least one subordinate entity may select for the uplink transmission. The at least one condition may be included in the indication transmitted at block 1204. For example, the indication may include a threshold timer value. The at least one condition may be associated with a service or at least one subordinate entity based on configuration information.

At block 1208, the scheduling entity may receive a packet from the at least one subordinate entity via the at least one resource based on the at least one condition being satisfied.

The at least one condition may relate to packets arriving at a subordinate entity for transmission before a first time instance, packets arriving at a subordinate entity for transmission during a time interval, packets arriving at a subordinate entity for transmission after a second time instance, packets having a time remaining before an expiration deadline within a threshold, an amount of battery life remaining at a subordinate entity, an emergency action, and/or a quality of service class to which packets belong.

The indication may further indicate an amount of the at least one resource allocated for the uplink transmission, wherein the amount is dependent on the at least one condition. For example, a first number of resources may be allocated for transmitting packets that arrived at a subordinate entity before the first time instance, a second number of resources may be allocated for transmitting packets that arrived at a subordinate entity during the time interval, and no resources may be allocated for transmitting packets that arrived at a subordinate entity after the second time instance.

In an aspect of the disclosure, the packet received at block 1208 is a packet associated with one or more logical channels allowed to be transmitted on the at least one resource. Accordingly, the indication transmitted at block 1204 may indicate a type of the at least one resource allocated and the type of the at least one resource may be mapped to one or more services (e.g., IOE service, MBB service, or MiCr service). For example, the indication may be a general allocation of resources for a service (e.g., IOE service) to allow any subordinate entity with small data to transmit in a contention-based manner.

In an aspect of the disclosure, the at least one condition transmitted at block 1206 may be transmitted via a configuration indicating whether the packet is allowed, required, or prohibited to be transmitted on the at least one resource. The configuration may be included in the transmitted indication. Thus, the configuration may be valid on a per-grant basis (per-indication basis) based on the grant contents (indication contents). Additionally or alternatively, the scheduling entity may transmit the configuration via a configuration message transmitted separately from the indication.

The configuration may include a logical channel-to-physical channel (LoCH-PHY) map indicating one or more physical channels allowed to be used for transmitting packets of a corresponding logical channel, or indicating one or more physical channels not allowed to be used for transmitting packets of a corresponding logical channel. Additionally or alternatively, the configuration may include a physical channel-to-service (PHY-service) map indicating one or more types of service data allowed to be transmitted via a corresponding physical channel, or indicating one or more types of service data not allowed to be transmitted via a corresponding physical channel.

The scheduling entity may transmit the configuration via a unicast message (e.g., as part of a link or bearer configuration message) or via a broadcast message (e.g., as part of system information). The scheduling entity may also transmit the configuration via a bearer establishment procedure. For example, the configuration transmission may be performed in a non-access stratum (NAS) so that the configuration transmission is performed once, and therefore, the configuration is not configured by a cell but by a network.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 5, 6 and 9-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a subordinate entity, comprising:
    receiving, from a scheduling entity, an indication of at least one resource allocated for an uplink transmission;
    receiving, from the scheduling entity, at least one condition associated with the at least one resource, wherein the at least one condition relates to at least a time condition associated with one or more packets to be transmitted at the subordinate entity, wherein the time condition includes at least one of:
        the one or more packets arriving at the subordinate entity before a first time instance,
        the one or more packets arriving at the subordinate entity during a time interval,
        the one or more packets arriving at the subordinate entity after a second time instance, or
        the one or more packets having less than a threshold amount of time remaining before a packet expiration deadline;
    evaluating whether the at least one condition is satisfied, wherein the evaluating comprises evaluating whether the one or more packets arrived at the subordinate entity during the time interval; and
    determining whether to transmit the one or more packets using the at least one resource based on the at least one condition being satisfied, wherein the determining whether to transmit comprises:
        transmitting the one or more packets using the at least one resource if the one or more packets arrived at the subordinate entity during the time interval, and
        refraining from transmitting the one or more packets using the at least one resource if the one or more packets did not arrive at the subordinate entity during the time interval.

2. The method of claim 1, wherein the indication is received according to at least one of:
    a semi-static manner via a unicast message;
    a semi-static manner via a broadcast message; or
    a dynamic manner via a unicast, broadcast, or multicast message.

3. The method of claim 1, wherein the at least one condition is:
    included in the indication; or
    associated with a service or the subordinate entity based on configuration information.

4. The method of claim 1, wherein the at least one resource comprises at least one of:
    a frequency resource;
    a time resource;
    a transmit power allocation; or
    a spatial resource.

5. The method of claim 1,
    wherein the at least one condition further relates to at least one of:
        an amount of battery life remaining at the subordinate entity;
        an emergency action; or
        a quality of service class to which the one or more packets belong.

6. The method of claim 1, wherein:
    the evaluating further comprises evaluating whether the one or more packets arrived at the subordinate entity before the first time instance; and
    the determining whether to transmit further comprises:
        transmitting the one or more packets using the at least one resource if the one or more packets arrived at the subordinate entity before the first time instance, and
        refraining from transmitting the one or more packets using the at least one resource if the one or more packets did not arrive at the subordinate entity before the first time instance.

7. The method of claim 1, wherein:
    the evaluating further comprises evaluating whether the one or more packets arrived at the subordinate entity after the second time instance; and
    the determining whether to transmit further comprises refraining from transmitting the one or more packets using the at least one resource if the one or more packets arrived at the subordinate entity after the second time instance.

8. The method of claim 1, wherein the indication further indicates an amount of the at least one resource allocated for the uplink transmission, the amount being dependent on the at least one condition, wherein:
    a first number of resources are allocated for transmitting the one or more packets that arrived at the subordinate entity before the first time instance,
    a second number of resources are allocated for transmitting the one or more packets that arrived at the subordinate entity during the time interval, and no resources are allocated for transmitting the one or more packets that arrived at the subordinate entity after the second time instance.

9. The method of claim 1, wherein:
the evaluating comprises determining one or more logical channels allowed to use the at least one resource for packet transmissions; and
the determining whether to transmit comprises transmitting the one or more packets if the one or more packets is associated with the determined one or more logical channels using the at least one resource.

10. The method of claim 9, wherein the determining the one or more logical channels comprises determining whether any packet from the one or more logical channels is allowed, required, or prohibited to be transmitted on the at least one resource.

11. The method of claim 9, wherein the indication indicates a type of the at least one resource allocated, and wherein the type of the at least one resource is associated with at least one service.

12. The method of claim 9, wherein the at least one condition is received via a configuration indicating whether the one or more packets is allowed, required, or prohibited to be transmitted on the at least one resource.

13. The method of claim 12, wherein the configuration includes a logical channel-to-physical channel (LoCH-PHY) map indicating:
one or more physical channels allowed to be used for transmitting the one or more packets of a corresponding logical channel; or
one or more physical channels not allowed to be used for transmitting the one or more packets of a corresponding logical channel.

14. The method of claim 12, wherein the configuration includes a physical channel-to-service (PHY-service) map indicating:
one or more types of service data allowed to be transmitted via a corresponding physical channel; or
one or more types of service data not allowed to be transmitted via a corresponding physical channel.

15. The method of claim 12, wherein the configuration is received via at least one of:
a unicast message;
a broadcast message;
a bearer establishment procedure; or
an application associated with the one or more packets.

16. The method of claim 1, wherein:
the indication indicates at least two types of resources allocated for the uplink transmission; and
the determining whether to transmit comprises:
selecting one of the at least two types of resources based on the at least one condition, and
transmitting the one or more packets using the selected type of resource.

17. An apparatus configured to communicate in a wireless network, comprising:
means for receiving, from a scheduling entity, an indication of at least one resource allocated for an uplink transmission;
means for receiving, from the scheduling entity, at least one condition associated with the at least one resource, wherein the at least one condition relates to at least a time condition associated with one or more packets to be transmitted at the apparatus, wherein the time condition includes at least one of:
the one or more packets arriving at the apparatus before a first time instance,
the one or more packets arriving at the apparatus during a time interval,
the one or more packets arriving at the apparatus after a second time instance, or
the one or more packets having less than a threshold amount of time remaining before a packet expiration deadline;
means for evaluating whether the at least one condition is satisfied, wherein the means for evaluating is configured to evaluate whether the one or more packets arrived at the apparatus during the time interval; and
means for determining whether to transmit the one or more packets using the at least one resource based on the at least one condition being satisfied, wherein the means for determining whether to transmit is configured to:
transmit the one or more packets using the at least one resource if the one or more packets arrived at the apparatus during the time interval, and
refrain from transmitting the one or more packets using the at least one resource if the one or more packets did not arrive at the apparatus during the time interval.

18. A subordinate device configured to communicate with a scheduling entity in a wireless communication network, comprising:
a memory;
a transceiver; and
a processing circuit coupled to the memory and the transceiver,
wherein the processing circuit and the memory are configured to:
receive, from a scheduling entity, an indication of at least one resource allocated for an uplink transmission,
receive, from the scheduling entity, at least one condition associated with the at least one resource, wherein the at least one condition relates to at least a time condition associated with one or more packets to be transmitted at the subordinate device, wherein the time condition includes at least one of:
the one or more packets arriving at the subordinate device before a first time instance,
the one or more packets arriving at the subordinate device during a time interval,
the one or more packets arriving at the subordinate device after a second time instance, or
the one or more packets having less than a threshold amount of time remaining before a packet expiration deadline,
evaluate whether the at least one condition is satisfied by evaluating whether the one or more packets arrived at the subordinate device during the time interval, and
determine whether to transmit the one or more packets using the at least one resource based on the at least one condition being satisfied by:
transmitting the one or more packets using the at least one resource if the one or more packets arrived at the subordinate device during the time interval, and
refrain from transmitting the one or more packets using the at least one resource if the one or more packets did not arrive at the subordinate device during the time interval.

19. A non-transitory processor-readable storage medium having one or more instructions which, when executed by at least one processing circuit, cause the at least one processing circuit to:
    receive, from a scheduling entity, an indication of at least one resource allocated for an uplink transmission;
    receive, from the scheduling entity, at least one condition associated with the at least one resource, wherein the at least one condition relates to at least a time condition associated with one or more packets to be transmitted at a subordinate entity, wherein the time condition includes at least one of:
        the one or more packets arriving at the subordinate entity before a first time instance,
        the one or more packets arriving at the subordinate entity during a time interval,
        the one or more packets arriving at the subordinate entity after a second time instance, or
        the one or more packets having less than a threshold amount of time remaining before a packet expiration deadline;
    evaluate whether the at least one condition is satisfied by evaluating whether the one or more packets arrived at the subordinate entity during the time interval; and
    determine whether to transmit the one more packets using the at least one resource based on the at least one condition being satisfied by:
        transmitting the one or more packets using the at least one resource if the one or more packets arrived at the subordinate entity during the time interval, and
        refraining from transmitting the one or more packets using the at least one resource if the one or more packets did not arrive at the subordinate entity during the time interval.

20. A method of wireless communication at a scheduling entity, comprising:
    generating an indication of at least one resource allocated for an uplink transmission, the at least one resource associated with at least one condition limiting access to the at least one resource;
    transmitting the indication to at least one subordinate entity;
    transmitting the at least one condition to the at least one subordinate entity, wherein the at least one condition relates to at least a time condition associated with one or more packets to be transmitted at the at least one subordinate entity, wherein the time condition includes at least one of:
        the one or more packets arriving at the at least one subordinate entity before a first time instance prior to transmission,
        the one or more packets arriving at the at least one subordinate entity during a time interval prior to transmission, or
        the one or more packets arriving at the at least one subordinate entity after a second time instance prior to transmission, or
        the one or more packets having less than a threshold amount of time remaining before a packet expiration deadline prior to transmission; and
    receiving the one or more packets from the at least one subordinate entity via the at least one resource based on the at least one condition being satisfied.

21. The method of claim 20, wherein the at least one condition is:
    included in the indication; or
    associated with a service or the at least one subordinate entity based on configuration information.

22. The method of claim 20, wherein the indication is transmitted to one subordinate entity in a semi-static manner via a unicast message, transmitted to more than one subordinate entity in a semi-static manner via a broadcast message, or transmitted to more than one subordinate entity in a dynamic manner via a unicast, broadcast, or multicast message.

23. The method of claim 20, wherein the at least one resource comprises at least one of:
    a frequency resource;
    a time resource;
    a transmit power allocation; or
    a spatial resource.

24. The method of claim 20,
    wherein the at least one condition further relates to at least one of:
        an amount of battery life remaining at a subordinate entity;
        an emergency action; or
        a quality of service class to which the one or more packets belong.

25. The method of claim 20, wherein the indication further indicates an amount of the at least one resource allocated for the uplink transmission, the amount being dependent on the at least one condition, wherein:
    a first number of resources are allocated for transmitting the one or more packets that arrived at the at least one subordinate entity before the first time instance,
    a second number of resources are allocated for transmitting the one or more packets that arrived at the subordinate entity during the time interval, and
    no resources are allocated for transmitting the one or more packets that arrived at the at least one subordinate entity after the second time instance.

26. The method of claim 20, wherein the received one or more packets is one or more packets associated with one or more logical channels allowed to use the at least one resource for packet transmissions.

27. The method of claim 26, wherein the indication indicates a type of the at least one resource allocated, and wherein the type of the at least one resource is associated with at least one service.

28. The method of claim 26, wherein the at least condition is transmitted via a configuration indicating whether the one or more packets is allowed, required, or prohibited to be transmitted on the at least one resource.

29. The method of claim 28, wherein the configuration includes a logical channel-to-physical channel (LoCH-PHY) map indicating:
    one or more physical channels allowed to be used for transmitting the one or more packets of a corresponding logical channel; or
    one or more physical channels not allowed to be used for transmitting the one or more packets of a corresponding logical channel.

30. The method of claim 28, wherein the configuration includes a physical channel-to-service (PHY-service) map indicating:
    one or more types of service data allowed to be transmitted via a corresponding physical channel; or
    one or more physical channels not allowed to be used for transmitting data of a corresponding logical channel.

31. The method of claim 28, wherein the configuration is transmitted via at least one of:
    a unicast message;

a broadcast message; or a bearer establishment procedure.

32. A scheduling entity apparatus in a wireless network, comprising:

means for generating an indication of at least one resource allocated for an uplink transmission, the at least one resource associated with at least one condition limiting access to the at least one resource;

means for transmitting the indication to at least one subordinate entity;

means for transmitting the at least one condition to the at least one subordinate entity, wherein the at least one condition relates to at least a time condition associated with one or more packets to be transmitted at the at least one subordinate entity, wherein the time condition includes at least one of:

the one or more packets arriving at the at least one subordinate entity before a first time instance prior to transmission, the one or more packets arriving at the at least one subordinate entity during a time interval prior to transmission, the one or more packets arriving at the at least one subordinate entity after a second time instance prior to transmission, or the one or more packets having less than a threshold amount of time remaining before a packet expiration deadline prior to transmission; and means for receiving a packet from the at least one subordinate entity via the at least one resource based on the at least one condition being satisfied.

33. A scheduling entity configured to manage a wireless communication network, comprising:

a memory;

a transceiver, and a processing circuit coupled to the memory and the transceiver, wherein the processing circuit and the memory are configured to:

generate an indication of at least one resource allocated for an uplink transmission, the at least one resource associated with at least one condition limiting access to the at least one resource, transmit the indication to at least one subordinate entity, transmit the at least one condition to the at least one subordinate entity, wherein the at least one condition relates to at least a time condition associated with one or more packets to be transmitted at the at least one subordinate entity, wherein the time condition includes at least one of:

the one or more packets arriving at the at least one subordinate entity before a first time instance prior to transmission, the one or more packets arriving at the at least one subordinate entity during a time interval prior to transmission, the one or more packets arriving at the at least one subordinate entity after a second time instance prior to transmission, or the one or more packets having less than a threshold amount of time remaining before a packet expiration deadline prior to transmission, and receive a packet from the at least one subordinate entity via the at least one resource based on the at least one condition being satisfied.

34. A non-transitory processor-readable storage medium having one or more instructions which, when executed by at least one processing circuit, cause the at least one processing circuit to:

generate an indication of at least one resource allocated for an uplink transmission, the at least one resource associated with at least one condition limiting access to the at least one resource;

transmit the indication to at least one subordinate entity;

transmit the at least one condition to the at least one subordinate entity, wherein the at least one condition relates to at least a time condition associated with one or more packets to be transmitted at the at least one subordinate entity, wherein the time condition includes at least one of:

the one or more packets arriving at the at least one subordinate entity before a first time instance prior to transmission, the one or more packets arriving at the at least one subordinate entity during a time interval prior to transmission, the one or more packets arriving at the at least one subordinate entity after a second time instance prior to transmission, or the one or more packets having less than a threshold amount of time remaining before a packet expiration deadline prior to transmission; and receive a packet from the at least one subordinate entity via the at least one resource based on the at least one condition being satisfied.

* * * * *